(12) United States Patent
Wolynski et al.

(10) Patent No.: US 9,212,485 B2
(45) Date of Patent: Dec. 15, 2015

(54) MODULAR BUILDING PANEL

(71) Applicants: Victor Wolynski, Cocoa, FL (US); James Wald, Cocoa, FL (US)

(72) Inventors: Victor Wolynski, Cocoa, FL (US); James Wald, Cocoa, FL (US)

(*) Notice: Subject to any disclaimer, the term of this patent is extended or adjusted under 35 U.S.C. 154(b) by 0 days.

(21) Appl. No.: 13/942,699

(22) Filed: Jul. 15, 2013

(65) Prior Publication Data

US 2014/0013695 A1 Jan. 16, 2014

Related U.S. Application Data

(60) Provisional application No. 61/671,394, filed on Jul. 13, 2012.

(51) Int. Cl.

| | | |
|---|---|---|
| *E04B 1/16* | (2006.01) | |
| *E04C 2/26* | (2006.01) | |
| *E04C 2/34* | (2006.01) | |
| *C04B 28/04* | (2006.01) | |
| *E04B 1/61* | (2006.01) | |
| *E04B 1/80* | (2006.01) | |
| *E04B 1/74* | (2006.01) | |
| *C04B 111/00* | (2006.01) | |

(52) U.S. Cl.
CPC . *E04C 2/26* (2013.01); *C04B 28/04* (2013.01); *E04B 1/167* (2013.01); *E04C 2/3405* (2013.01); *C04B 2111/00612* (2013.01); *E04B 1/6179* (2013.01); *E04B 1/80* (2013.01); *E04B 2001/742* (2013.01); *E04B 2001/747* (2013.01); *E04C 2002/3455* (2013.01); *E04C 2002/3472* (2013.01)

(58) Field of Classification Search
CPC ..... E04B 1/167; E04B 1/80; E04B 2001/742; E04B 2001/747; E04C 2/26; E04C 2002/3472; E04C 2002/3444; E04C 2002/3455; E04C 2/3405

USPC ........ 52/426, 220.4, 270, 267, 783.1, 783.17, 52/783.18, 783.19, 202, 783.11, 582.1
See application file for complete search history.

(56) References Cited

U.S. PATENT DOCUMENTS

| | | | | | |
|---|---|---|---|---|---|
| 2,039,601 | A | * | 5/1936 | London | 52/479 |
| 2,076,473 | A | * | 4/1937 | London | 52/426 |
| 2,132,642 | A | * | 10/1938 | Parsons | 428/137 |
| 2,333,343 | A | * | 11/1943 | Sendzimir | 228/118 |

(Continued)

FOREIGN PATENT DOCUMENTS

EP 0760042 10/2002

*Primary Examiner* — Adriana Figueroa
*Assistant Examiner* — Jessie Fonseca
(74) *Attorney, Agent, or Firm* — Stephen C. Thomas

(57) ABSTRACT

An improved modular building panel and system for building construction is disclosed. The improved modular building panel comprises a novel honeycomb or lattice core comprising multiple layers of corrugated, preferably metal, components mechanically connected by any means known in the art, but which may be chemical bonding. External cladding layers comprising a novel cement mix comprising, in a preferred embodiment, Portland cement, silica sand, perlite, glass beads, and water, in combination with the honeycomb structure, provide a lightweight, highly durable, low-cost, projectile resistant, highly insulating, water, mold and mildew resistant, wind resistant novel modular wall system which is adapted for use in commercial, residential, and other construction and which provides superior security to the user. The modular building panel and system of the invention may be utilized for walls, roofs, floors, bridges, or other structures.

18 Claims, 31 Drawing Sheets

(56) References Cited

U.S. PATENT DOCUMENTS

| | | | |
|---|---|---|---|
| 2,501,180 A * | 3/1950 | Kunz | 428/116 |
| 3,950,910 A * | 4/1976 | Pobanz | 52/783.11 |
| 4,106,588 A * | 8/1978 | Moore et al. | 181/284 |
| 4,372,092 A | 2/1983 | Lopez | |
| 4,434,592 A * | 3/1984 | Reneault et al. | 52/145 |
| 4,643,933 A * | 2/1987 | Picken | 428/116 |
| 5,417,026 A | 5/1995 | Brumfield | |
| 5,551,204 A | 9/1996 | Mayrand | |
| 5,681,641 A * | 10/1997 | Grigsby et al. | 428/182 |
| 5,875,596 A | 3/1999 | Muller | |
| 5,921,047 A | 7/1999 | Walker | |
| 6,003,283 A * | 12/1999 | Hull | 52/783.18 |
| 6,197,402 B1 * | 3/2001 | Miller et al. | 428/118 |
| 6,253,530 B1 | 7/2001 | Price et al. | |
| 6,739,104 B2 * | 5/2004 | Tokonabe et al. | 52/406.2 |
| 7,100,342 B2 | 9/2006 | Holloway | |
| 7,127,865 B2 | 10/2006 | Douglas | |
| 7,493,738 B2 | 2/2009 | Bui | |
| 7,811,666 B2 | 10/2010 | Dry | |
| 7,895,796 B2 | 3/2011 | Baldock et al. | |
| 7,922,954 B2 | 4/2011 | Marschke | |
| 7,931,958 B2 | 4/2011 | Arai et al. | |
| 8,001,730 B2 | 8/2011 | Wallance | |
| 8,122,679 B2 | 2/2012 | Tonyan et al. | |
| 8,187,375 B2 | 5/2012 | Garuti, Jr. et al. | |
| 8,677,713 B1 * | 3/2014 | Sheehy | 52/588.1 |
| 2002/0014051 A1 * | 2/2002 | Fraval et al. | 52/794.1 |
| 2003/0150182 A1 * | 8/2003 | Chou et al. | 52/309.8 |
| 2003/0159400 A1 * | 8/2003 | Forrester et al. | 52/783.17 |
| 2004/0009338 A1 | 1/2004 | Jo et al. | |
| 2006/0048640 A1 * | 3/2006 | Terry et al. | 89/36.02 |
| 2006/0168906 A1 | 8/2006 | Tonyan et al. | |
| 2007/0062143 A1 | 3/2007 | Noushad | |
| 2010/0043309 A1 | 2/2010 | Martin et al. | |
| 2011/0226425 A1 | 9/2011 | Forbis et al. | |
| 2011/0308259 A1 | 12/2011 | Wray et al. | |
| 2011/0318562 A1 | 12/2011 | Dry | |
| 2012/0085062 A1 | 4/2012 | Neumayr | |

* cited by examiner

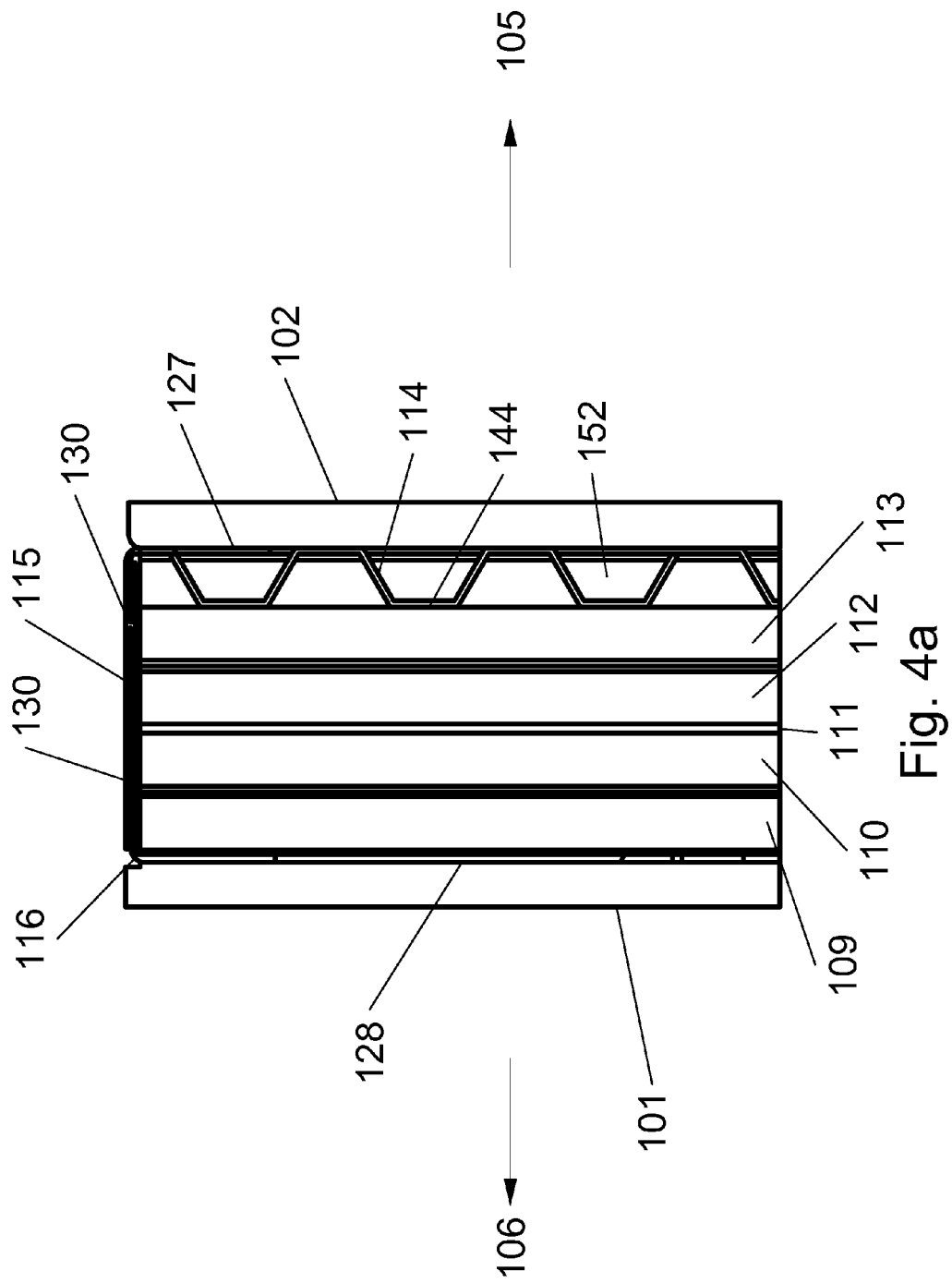

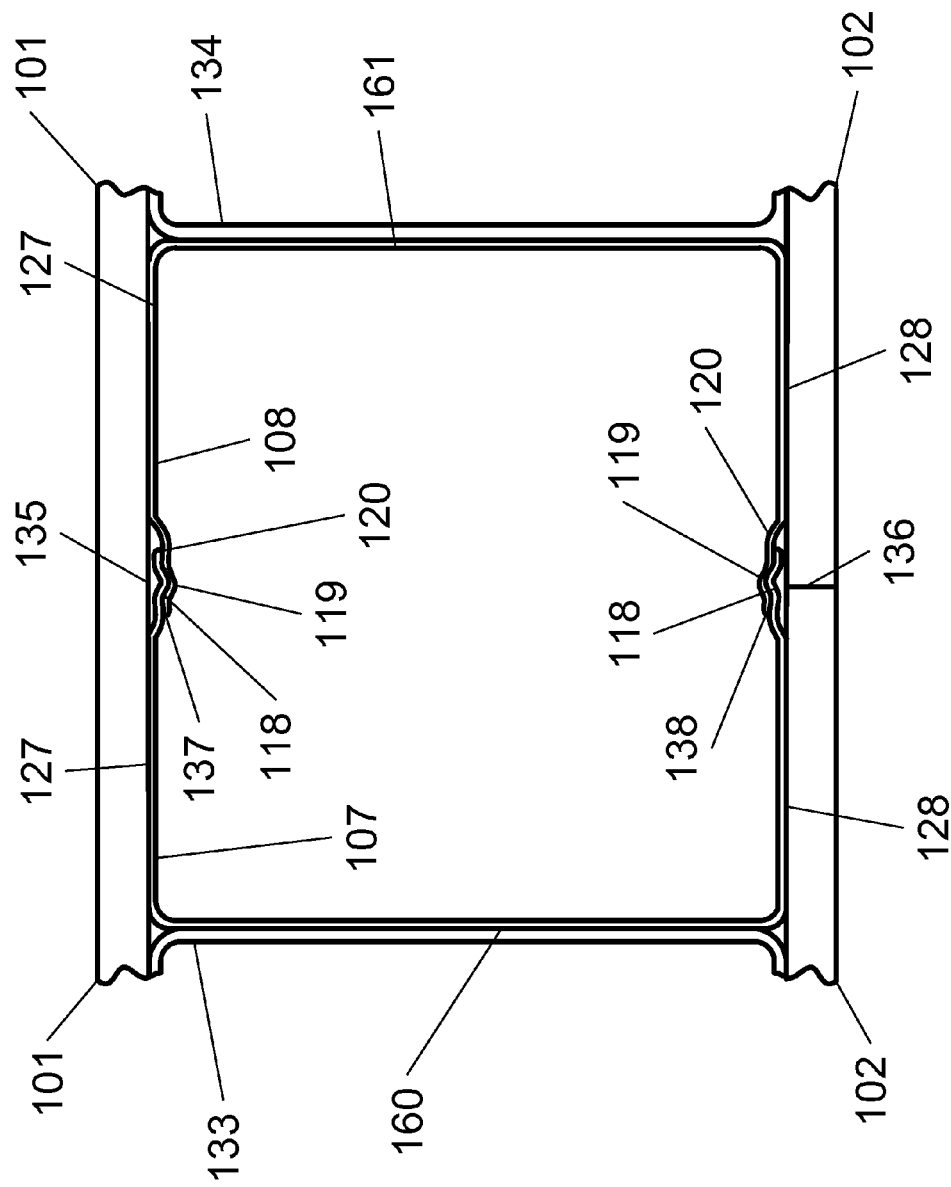

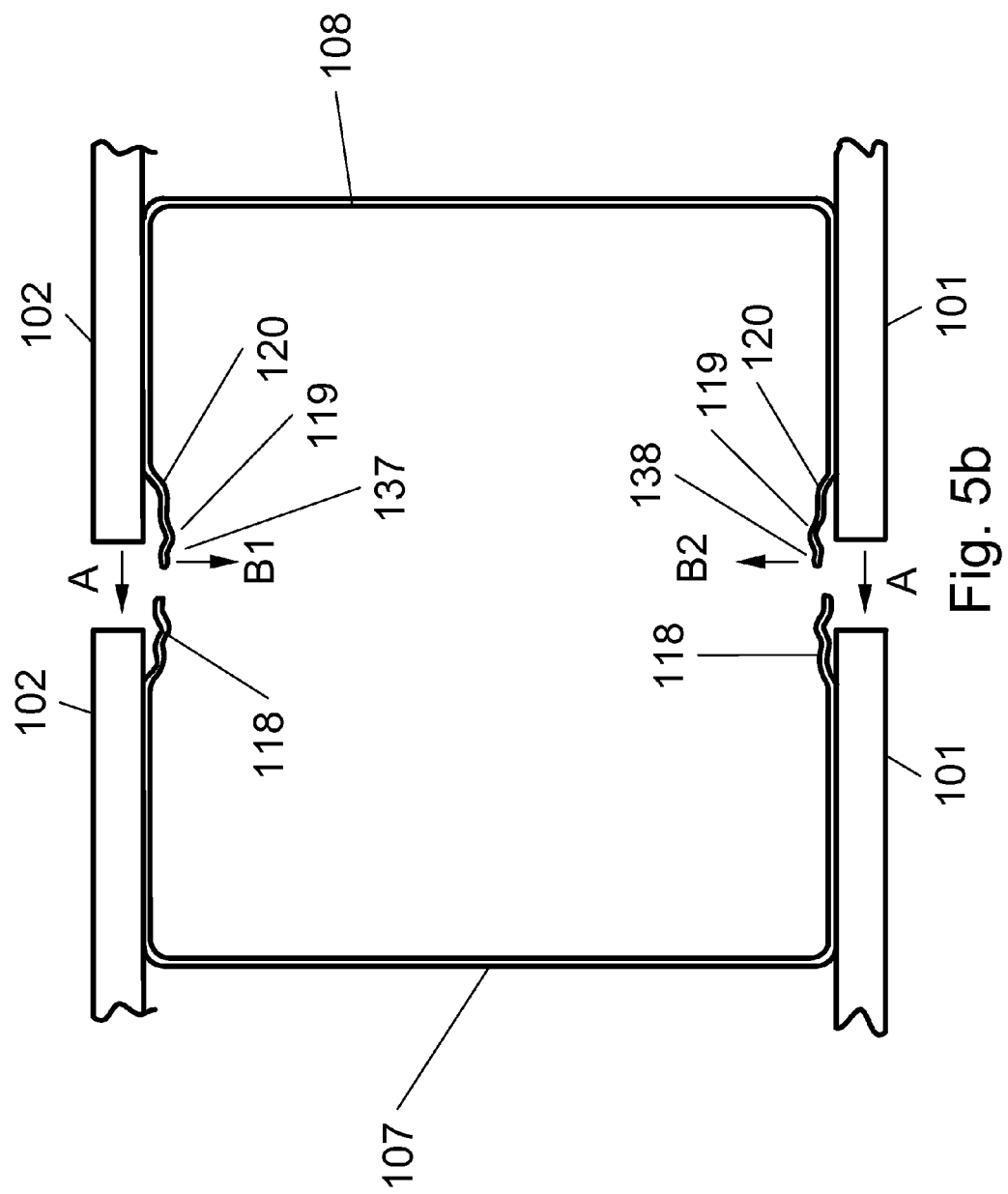

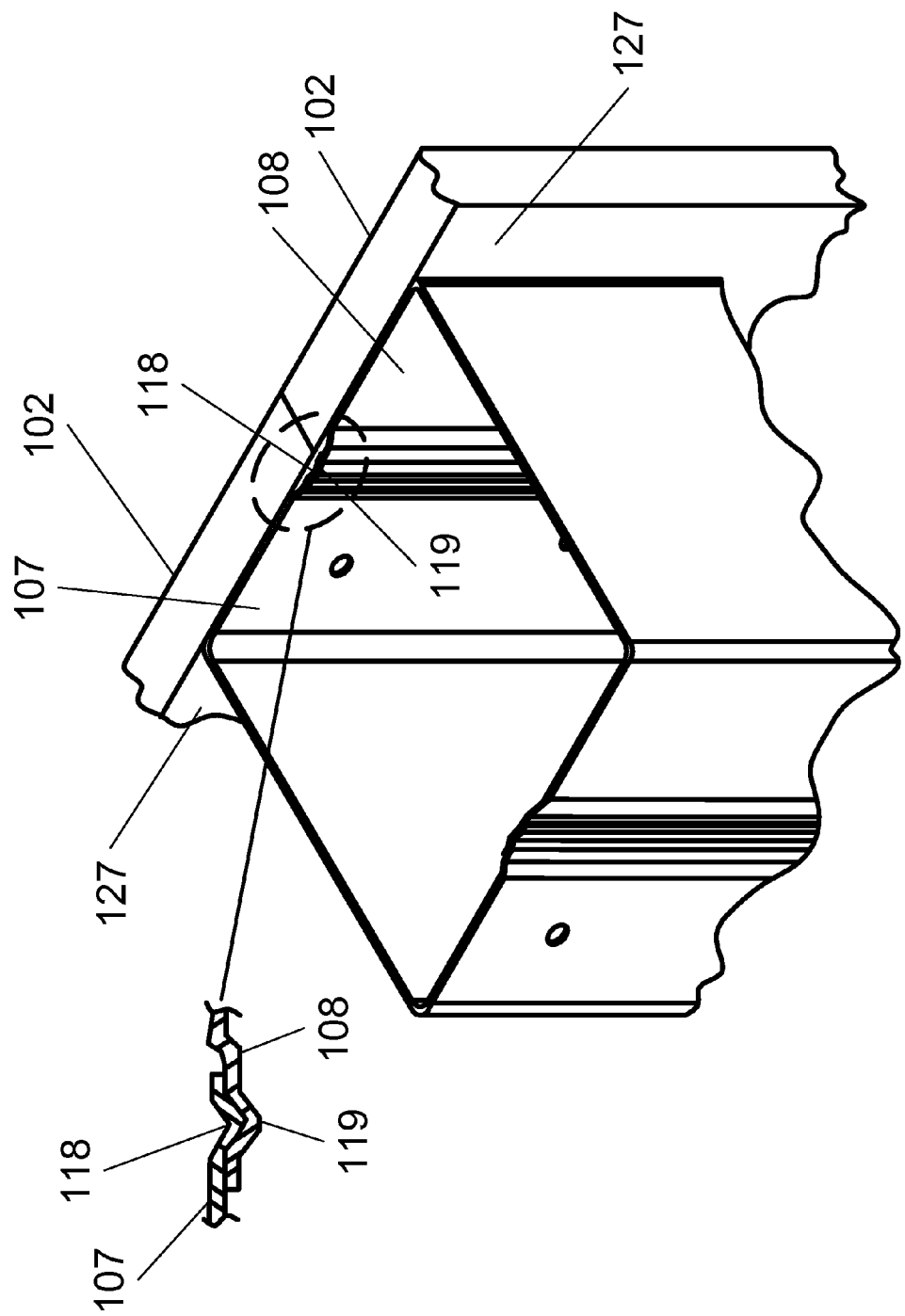

MODULAR BUILDING PANEL

CROSS REFERENCE TO RELATED APPLICATIONS

This non-provisional patent application claims the benefit of provisional application Ser. No. 61/671,394 filed in the United States Patent and Trademark Office (USPTO) on Jul. 13, 2012, and which is incorporated herein by reference in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The invention relates to the field of modular building systems for structures such as, for example, single-family homes, warehouse facilities, multifamily structures, commercial office structures, medical complexes, assisted living facilities, and the like. The invention is directed to a modular panel comprising a combination of lightweight concrete panels in combination with other structures such as, for instance, honeycomb and/or lattice structures to provide desired normal and structural characteristics. The system and method of the invention provide improved lifespan, ease of manufacture, modular panel construction, low maintenance, resistance to water damage, improved thermal characteristics leading to energy savings, and reduce time for construction. The invention further comprises novel mixtures for concrete which offer the benefits of high insulation factor, resistance to infestation, resistance to water damage, mold and mildew resistance, fire resistance, biohazard resistance, and other specific benefits. When the novel concrete mix is used as an element of the novel modular wall panel system, the resultant structure exhibits superior resistance to tampering, break-ins, piercing by projectiles, and other physical security attributes. The modular panel and system of the present invention are adapted for use in any wall construction, but are particularly suited to external walls.

2. Background Art

Building structures are generally intended, as a primary function, to withstand environmental and man-made threats and to provide shelter to the occupants and items contained within the structure. The art of building construction has advanced steadily since man's early history in which extremely simple structures were the norm. Today's building structures typically comprise structural elements and covering elements which may include steel beams, other metallic interior structures, concrete sheaths, composite materials, cement block, wood beams, layered construction and other systems. However, a need exists for a lightweight, low-cost, easy to construct, mildew and mold resistant, projectile resistant, environmentally secure building system that is also safe from man-made threats such as burglary, projectiles, and the like. Furthermore, severe weather threats such as floods, hurricanes, strong storms and tornadoes threaten structures with projectile damage, wind damage, water damage and the like. Therefore, a further need exists for structures that are resistant to water damage to the point that they may even be submerged such as, for example, during a flood or storm surge from a hurricane, such that after the weather threats have dissipated the structure remains habitable, retains its structural integrity, resists mold and mildew growth, and is not otherwise permanently damaged. The present invention overcomes the shortcomings of the prior art using a novel structure and concrete mix to provide these desired features.

Modular wall panels and concrete mixes are known in the art generally. For instance, U.S. Pat. No. 4,372,092 to Lopez describes a precast modular panel suitable for forming at least a portion of a wall or other part of the building and associated methods of constructing said panel, the panel comprising light weight, high-strength, water resistant concrete achieved by a unique combination of lightweight aggregates and structural additives, said concrete therefore exhibiting high structural strength and high insulative properties. The panel of this U.S. patent comprises a layer of lightweight high-strength concrete possessing high insulative properties combined with a layer of lightweight concrete particularly selected to enhance the composite insulative properties of the panel may be constructed with a minimum of labor and with maximum utilization of available forms and the like, and they carry provisions for his ready construction with other similar panels and with other building structures. The panel comprises also electrical outlets and passages there through so that such passages need not be installed in the building walls after construction. However, modular panel of U.S. Pat. No. 4,372,092 to Lopez provides inferior thermal insulative properties and inferior structural properties due to the essentially solid construction of the panel. Furthermore, the panel of U.S. Pat. No. 4,372,092 to Lopez is heavier due to its solid construction.

Another building component of the prior art is that described in U.S. Pat. No. 5,417,026. This US patent describes a corrugated building component and system comprising a corrugated panel made up of fluted layers of sheet material affluence form and passages to receive connecting rods which may extend from one panel and into an adjacent panel locking the panels together. The panels also include rabbited edges that interfit along with the connecting rods to produce structural units. A base plate where footing is described within the system with upright tie rods used to secure the assembled panels to the footing or base plate is described. Top, bottom, and in plates may be provided on sides and instantly elongated panels, to be joined with connecting members and reinforcing connectors. However, the invention described in U.S. Pat. No. 5,417,026 to Brumfield does not disclose a lightweight novel concrete exterior surface that is lightweight, mildew and mold resistance, and resistant to water damage and projectile damage. Furthermore, the invention described in U.S. Pat. No. 5,417,026 to Brumfield comprises no thermal breaks and is not adapted to support the use of filler material.

Yet another modular wall system is disclosed in U.S. Pat. No. 5,551,204 to Mayrand. This US patent describes a composite structural steel wall reinforced with concrete and a form system. The wall comprises a corrugated steel sheet defining a plurality of integrally formed alternately inverted spaced ridges. The ridges extend on opposed sides of the sheet and are separated by troughs defined by a rear face of the ridges on an opposite side of the sides in the integrally formed side wall of opposed ridges on a common side of the sheet. A first wall structure is secured to at least some of the ridges on the other of the opposed side of the corrugated steel sheet. A second wall structure is secured to at least some of the ridges on the other of the opposed sides of the corrugated steel sheet.

The first and second wall structures form at least an integral part of the finished wall surfaces and are spaced apart and interconnected substantially parallel to one another by the corrugated steel sheet, whereby to constitute a form to receive concrete from a top thereof and to form the structural steel wall reinforced with concrete. The disclosure of this United States patent describes an invention that does not exhibit multilayer honeycomb construction, lightweight concrete panels, or any of the other attributes desirable in a lightweight, water resistant structural modular panel for building construction. Furthermore, the invention described in U.S. Pat. No. 5,551,204 to Mayrand does not provide the superior structural strength afforded by honeycomb cells, and it also exhibits inferior insulative properties due to the direct thermal channels created by internal steel support members. This U.S. patent simply uses the corrugated steel sheet as a mold for traditional concrete construction.

BRIEF SUMMARY OF THE INVENTION

The present invention comprises a system and/or method that has one or more of the following features and/or steps, which alone or in any combination may comprise patentable subject matter.

In accordance with one embodiment of the present invention, the invention comprises a novel modular building panel comprising a honeycomb interior structure in combination with a novel exterior cladding which may comprise a novel cement mixture to achieve the desired features of light weight, resistance to mold and mildew, resistance to intrusion, resistance to projectile damage, ability to withstand extreme environmental conditions such as high wind and flooding, and is also low-cost, simple to manufacture and easy to assemble. In a preferred embodiment, multiple layers of corrugated elements, which may comprise a metal, may be structurally combined, some in orthogonal orientation, with exterior and interior cladding elements forming an interior cladding and an exterior cladding and which may comprise the novel cement mix described herein. The novel cement mix may comprise, in a preferred embodiment, Portland cement, silica sand (quartz), perlite, glass beads of various diameter, fiber glass shards, vinyl ester (or epoxy), and water. Alternate embodiments of the novel concrete mix may further comprise fly ash, calcium carbonate (water slaked lime), sugar, polyethylene Teripthalate shards, and Elemix™ XE polystyrene spheres.

The corrugated elements of the invention may be attached by any means known in the art including but not limited to sheet metal screws, threaded fasteners, rivets, chemical bonding such as adhesives or welding. In particular, spot welding may be used to attach the corrugated elements when said corrugated elements comprise a metal.

The interior spaces of the modular building panel of the invention form interstitial spaces, which may be filled with insulating material or may be left unfilled so as to form spaces containing only air. In this manner, the interstitial spaces may be filled with insulating material or air, but in any event provide thermal insulation between the exterior cladding and interior cladding of the modular building panel of the invention.

The modular building panel of the invention further comprises male and female snap channels extending from either vertical side of the panel such that a plurality of panels may snap together and are held in place by action of the male and female snap channels which further comprise male and female snap channel retaining chevrons which interlock to form a positive attachment between side-by-side modular building panels of the invention. In this manner, assembly of a wall section comprised of modular building panels of the invention is achieved in a rapid and labor efficient manner. The bottom surface of the modular building panel of the invention may preferably rest in a step formed in a receiving foundation structure such as a footer, monolithic slab, or other foundation structure. It is not necessary that the step be utilized; the modular building panel of the invention may be installed on a planar surface of any type or nature and secured thereto by any of the well-known means in the art for securing a wall panel to an underlying structure or foundation such as for instance right angle brackets, metal straps, and other means known in the art.

The modular wall panel construction of the present invention exhibits superior fire resistance, resistance to environmental conditions, superior insulative characteristics including R factors of up to 50, resistance to man-made threats, low cost, and ease of construction due to the very stiff (yet lightweight) hollow nature of the construction. The novel modular wall panel system and method of the invention, along with the novel concrete mix of the invention, may be used in combination with other systems such as solar panels and water production systems to provide a structure that is essentially self-sustaining, permanent, and highly secure. Such construction may be useful for applications such as military installations, outposts, disaster survival and recovery, remote installation locations in environmentally harsh environments such as deserts, polar regions, or any other remote or wilderness location, and the like. However, the modular wall panel system and method of the invention and the novel concrete mixture of the system are also applicable to domestic residential and commercial construction and provides significant advantages for such construction as mentioned above.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention.

Specifically, a first preferred and second preferred embodiment of the modular building panel of the invention is depicted in the figures of the drawings. In the drawings:

FIG. 4a depicts a cross-sectional view taken at the top of the first preferred embodiment of the modular building panel of the invention.

FIG. 5a depicts a top view of the assembled male snap channel and female snap channel of the first preferred embodiment of the invention.

FIG. 5b depicts a top view of the male snap channel being inserted into the female snap channel in the first preferred embodiment of the invention.

FIG. 6 depicts a perspective view of the assembled male snap channel and female snap channel of the first preferred embodiment of the invention.

DETAILED DESCRIPTION OF THE INVENTION

The following documentation provides a detailed description of the invention.

Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

As used within this disclosure, the term threaded fasteners or screws may mean sheet metal screws, male threads accepted by female threads, self tapping screws or any other type of threaded fastener known in the art. Furthermore, for all instances where attachments are made to the concrete panels of the invention, the method of attachment comprises chemical bonding, rivets and threaded fasteners as well as any other method known in the art or otherwise described herein.

The modular wall systems of the prior art are complex, time-consuming to erect, and offer no advantages for resistance to mold, mildew, weather, water damage, projectile damage or other threats which a building may encounter during its lifetime. The present invention overcomes the shortcomings of the prior art by a novel combination of honeycomb or lattice structure which may comprise corrugated sections brought together to form a honeycomb structure with interstitial spaces that may be filled in any combination with insulating materials or may simply be left filled with air. In a preferred embodiment the corrugated members are comprised of a metal, for instance aluminum, and the inner and outer panels of the structure comprise a novel mixture of concrete which is lightweight and exhibits superior mold, mildew, and water damage resistance properties.

Figure 1A:
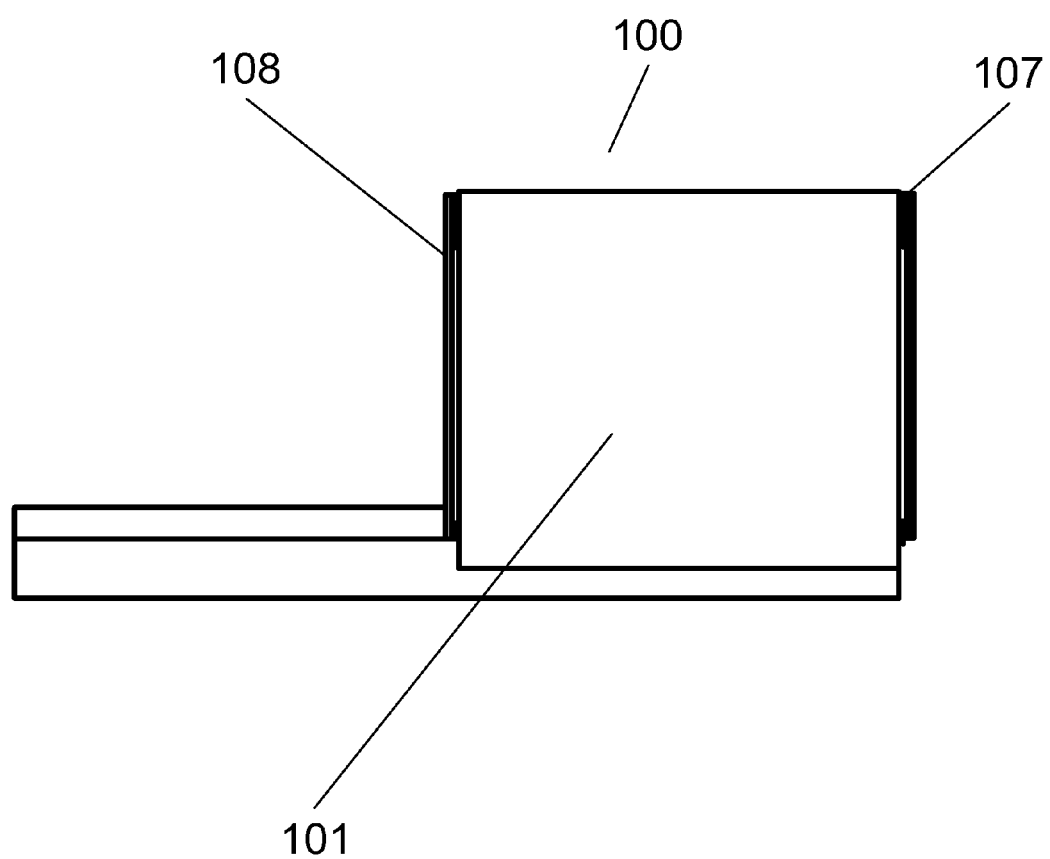
FIG. 1a depicts a front orthogonal view of the modular building panel of the invention is depicted.

Referring now to FIG. 1a, a front orthogonal view of the first preferred embodiment of the modular building panel of the invention is depicted. The modular building panel of the invention comprises an external cladding panel 101, and interior cladding panel 102 (not shown in FIG. 1a) and further comprises corrugated members, at least one thermal break member, top plates, fasteners (also not shown in FIG. 1a), and male and female snap channels 108 and 107, respectively.

Figure 1B:
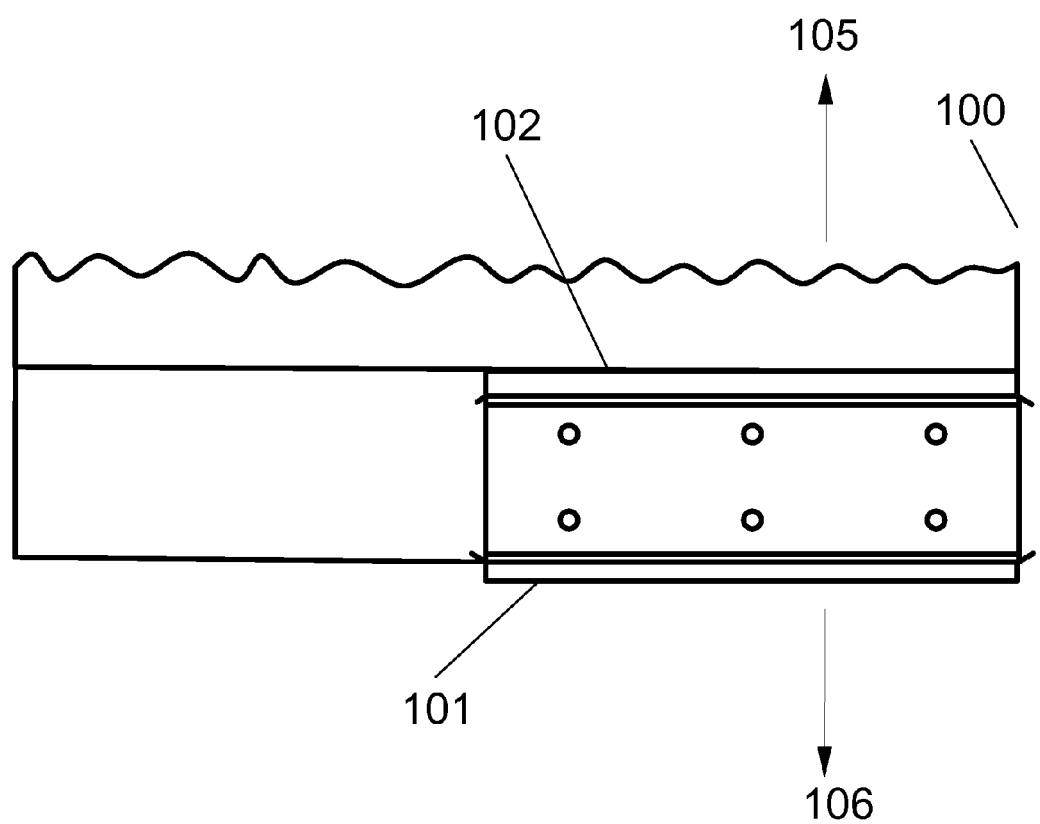
FIG. 1b depicts a right side orthogonal view of the modular building panel of the invention is depicted.

Referring now to FIG. 1b, a right side orthogonal view of the modular building panel of the invention 100 is depicted. Exterior panel 101 is intended to face the outside of, for instance, a building comprised of modular building panels of the invention, as is depicted by arrow 106 which depicts the exterior side of the building or other structure which is comprised of the modular building panel of the invention. Likewise, arrow 105 points to the interior side of the building or other structure which is comprised of the modular building panel of the invention. Interior panel 102 faces the interior side of the building or other structure; exterior panel 101 faces the exterior side of the building or other structure. Exterior foundation overlap 121 is formed by the extension of exterior panel 101 below the surface of the other elements of the modular building panel of the invention as depicted in FIG. 1b.

Figure 1C:
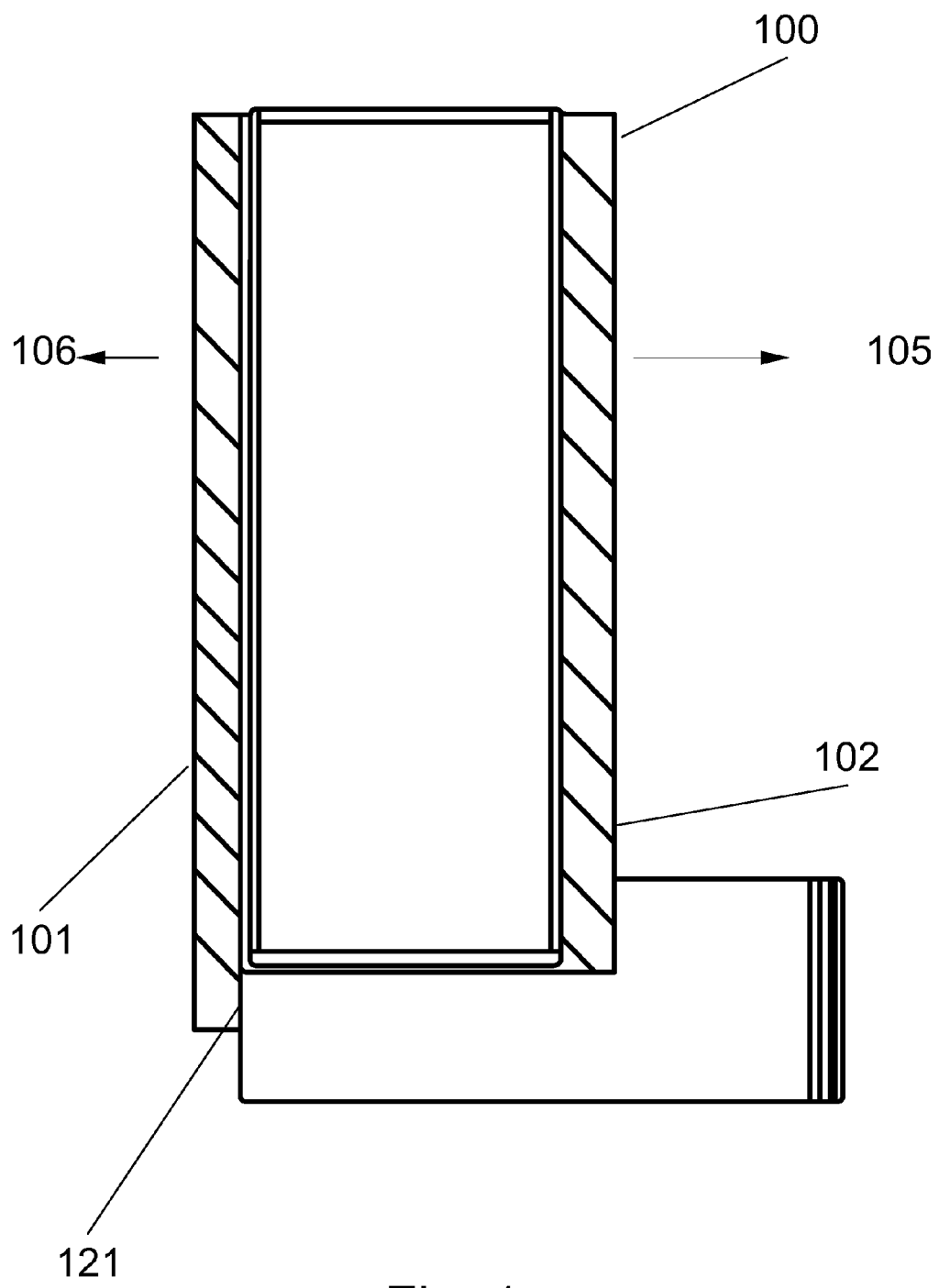
FIG. 1c depicts a top orthogonal view of the modular building panel of the invention is depicted.

Referring now to FIG. 1c, a top orthogonal view of the modular building panel of the invention is depicted. Exterior panel 101 faces to the outside of building or other structure which is comprised of the modular building panel of the invention. As can be seen in the figure arrow 106 indicates the direction of the exterior of the building or other structure. Interior panel 102 faces the inside of the building or other structure which is comprised of the modular building panel of the invention. Arrow 105 faces the interior of the building or other structure.

Figure 1D:
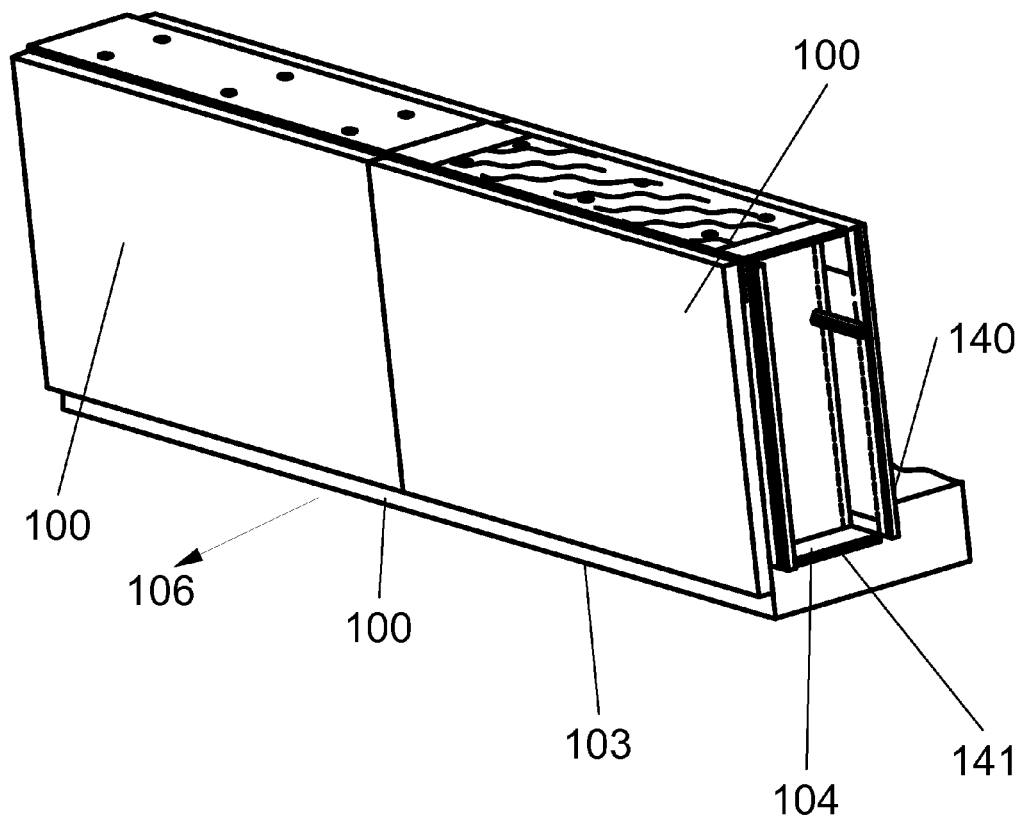
FIG. 1d depicts a perspective view of an assembly of a plurality of the modular building panel of the invention is depicted, showing a plurality of modular building panels snapped together and installed on a foundation comprising a foundation step.

Referring now to FIG. 1d, a perspective view of an assembly of a plurality of the modular building panels 100 of the invention is depicted, showing a plurality of modular building panels snapped together and installed on a foundation comprising a foundation step 104 having a foundation step width 141. It can be seen from this view that a contiguous wall suitable for the exterior wall of a building or other structure is formed by the snapping together of a plurality of the modular building panels 100 of the invention. Furthermore, in a preferred embodiment, the assembled modular building panels 100 of the invention would rest their bottom surface onto a foundation step 104 adapted to receive the modular building panels of the invention 100, and in the preferred embodiment the width of foundation step 104 may be adapted to receive the bottom surfaces of modular building panels 100 such that interior panel 102 is in contact with foundation step wall 140 as depicted in the drawing.

Figure 2A:
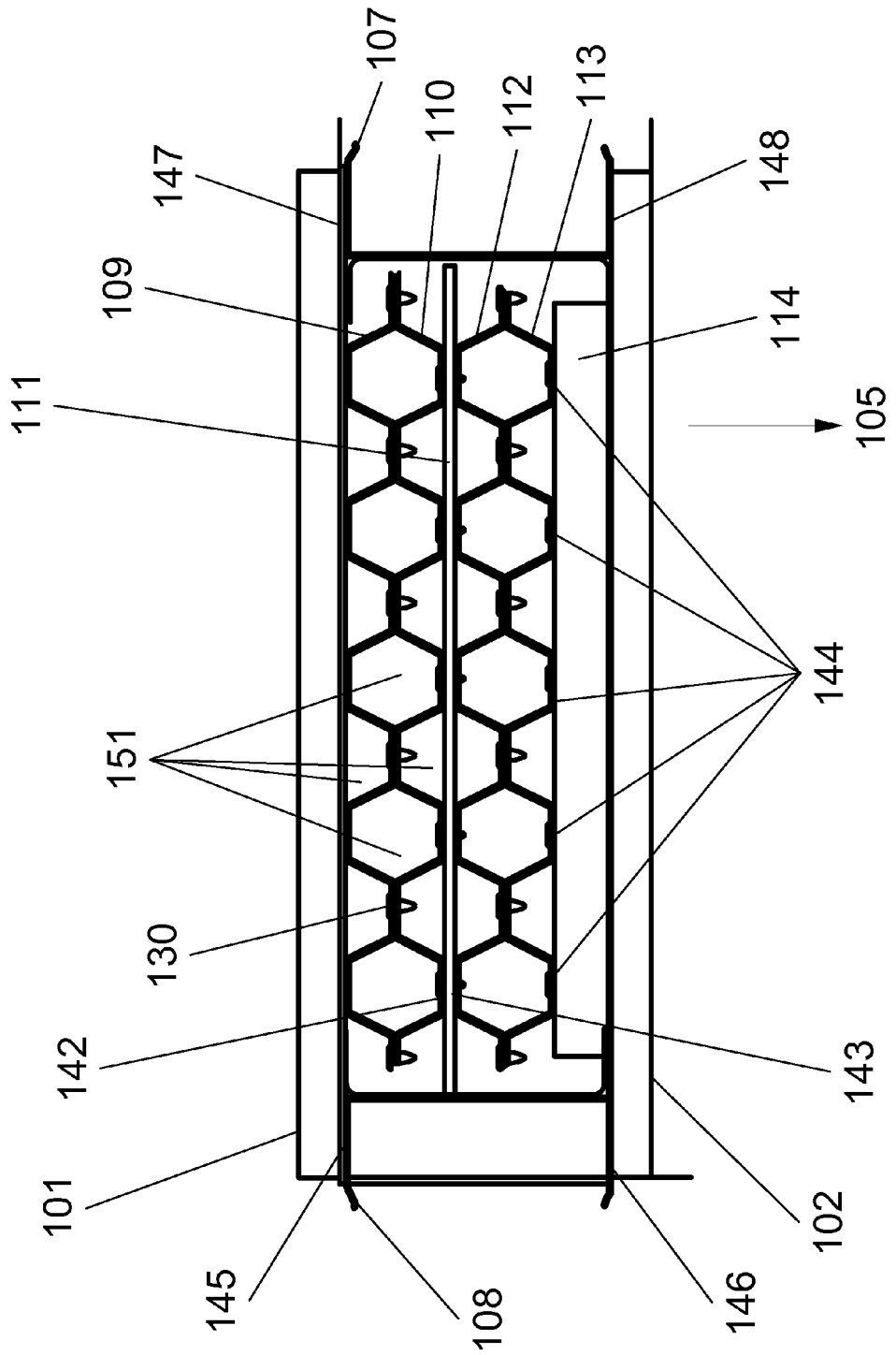
FIG. 2a depicts a top view of the first preferred embodiment of the modular building panel of the invention with the top plates of the invention removed exposing the corrugated panels, thermal panel, female snap channel, and male snap channel of the invention in which screws are utilized to attach the corrugated elements of the invention to one another.

Referring now to FIG. 2a, a top view of the first preferred embodiment of the modular building panel of the invention with the top plates of the invention removed exposing the corrugated panels, thermal panel, female snap channel, and male snap channel of the invention in which screws are utilized to attach the corrugated elements of the invention to one another. It can be seen from this figure that vertical corrugated panels 109 and 110 are brought together and attached as described herein to form a first vertical honeycomb structure. Likewise, vertical corrugated panels 112 and 113 are brought together and attached as described herein to form a second vertical honeycomb structure.

Still referring to FIG. 2a, the first honeycomb structure and second vertical honeycomb structure are oriented with thermal panel 111 between them such that the first vertical honeycomb structure is attached a first side of thermal panel 111 by at least one, and preferably a plurality of, first attachment surfaces 142 and the second honeycomb structure is attached to a second side of thermal panel 111 by at least one, and preferably a plurality of, second attachment surfaces 143. The method of attachment of first vertical honeycomb panel to the first side of thermal panel 111 and the method of attachment of second vertical honeycomb panel to the second side of thermal panel 111 may be chemical bonding, rivets, threaded fasteners or any other means known in the art for attaching planar structures to one another. In a preferred embodiment, the method of attachment of first vertical honeycomb panel to the first side of thermal panel 111 and the method of attachment of second vertical honeycomb panel to the second side of thermal panel 111 is chemical bonding.

Still referring to FIG. 2a, the second vertical honeycomb structure, which comprises third vertical corrugated panel 112 and fourth vertical corrugated panel 113, is attached to horizontal corrugated panel 114 as shown in the figure by at least one third attachment surface 144. The method of attachment of fourth vertical corrugated panel 113 to horizontal corrugated panel 114 may be any means known in the art for attaching planar surfaces such as, for example, threaded fasteners, sheet metal screws, rivets, chemical bonding, welding such as spot welding or any other means known in the art. Preferably, the modular building panel of the invention comprises a plurality of third attachment surface 144.

Still referring to FIG. 2a, female snap channel 107 is attached to interior building panel 102 at six attachment surface 147 and seventh attachment surface 148. The method of attachment of female snap channel 107 to interior building panel 102 at six attachment surface 147 and seventh attachment surface 148 may be any means known in the art including, but not limited to, threaded fasteners or chemical bonding, or both. Likewise, male snap channel 108 is attached to interior panel 102 at fourth attachment surface 145 and outer panel 101 at fifth attachment surface 146. The method of attachment of male snap channel 108 to interior panel 102 at fourth attachment surface 145 and to exterior panel 101 at fifth attachment surface 146 may be any means known in the art such as, but not limited to, threaded fasteners or chemical bonding, or both.

Still referring to FIG. 2a it can be seen that vertical interstitial spaces 151 are formed by the first honeycomb structure, second honeycomb structure, and other interior spaces of the modular building panel of the invention. Any or all of these vertical interstitial spaces may be left empty, that is, filled with air, for insulating purposes or they may be filled or partially filled with interstitial filling materials in order to achieve certain structural or thermal and/or acoustic insulation characteristics. Interstitial filling materials may include for example, Aerogel, sand, Perlite, no filler, or any combination thereof. Aerogels are an open-celled, mesoporous, solid foam that is composed of a network of interconnected nanostructures and that exhibits a porosity (non-solid volume) of no less than 50%. Aerogels may be fabricated from, for example, silica; transition metal oxides such as iron oxide; lanthanide and actinide metal oxides such as praseodymium oxide; main group oxides such as tin oxide; organic polymers such as resorcinol-formaldehyde, phenol-formaldehyde, polyacrylates, polystyrenes, polyurethanes, and epoxies; biological polymers such as gelatin, pectin, and agar; semiconductor nanostructures such as cadmium selenide; carbon; carbon nanotubes; and metals. Perlite is the material known by that name that is naturally occurring siliceous glass that expands from four to twenty times its original volume when heated to a suitable point in its softening range which may be, for instance, 1600 degrees Celsius and which in its expanded form weighs less than twenty-five pounds per cubic foot.

Figure 2B:
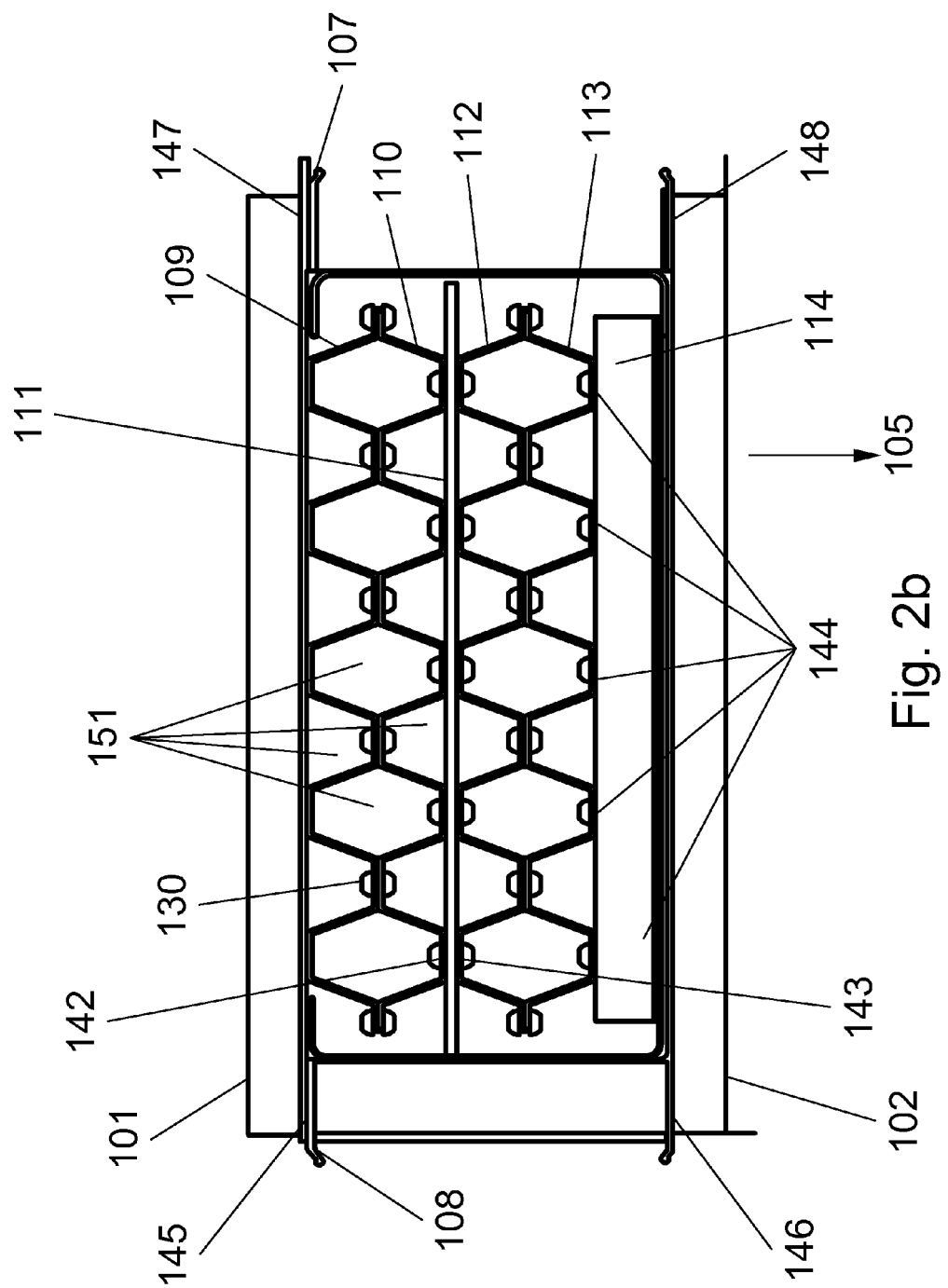
FIG. 2b depicts a top view of the first preferred embodiment of the modular building panel of the invention with the top plates of the invention removed exposing the corrugated panels, thermal panel, female snap channel, and male snap channel of the invention in which rivets are utilized to attach the corrugated elements of the invention to one another.
Figure 2C:
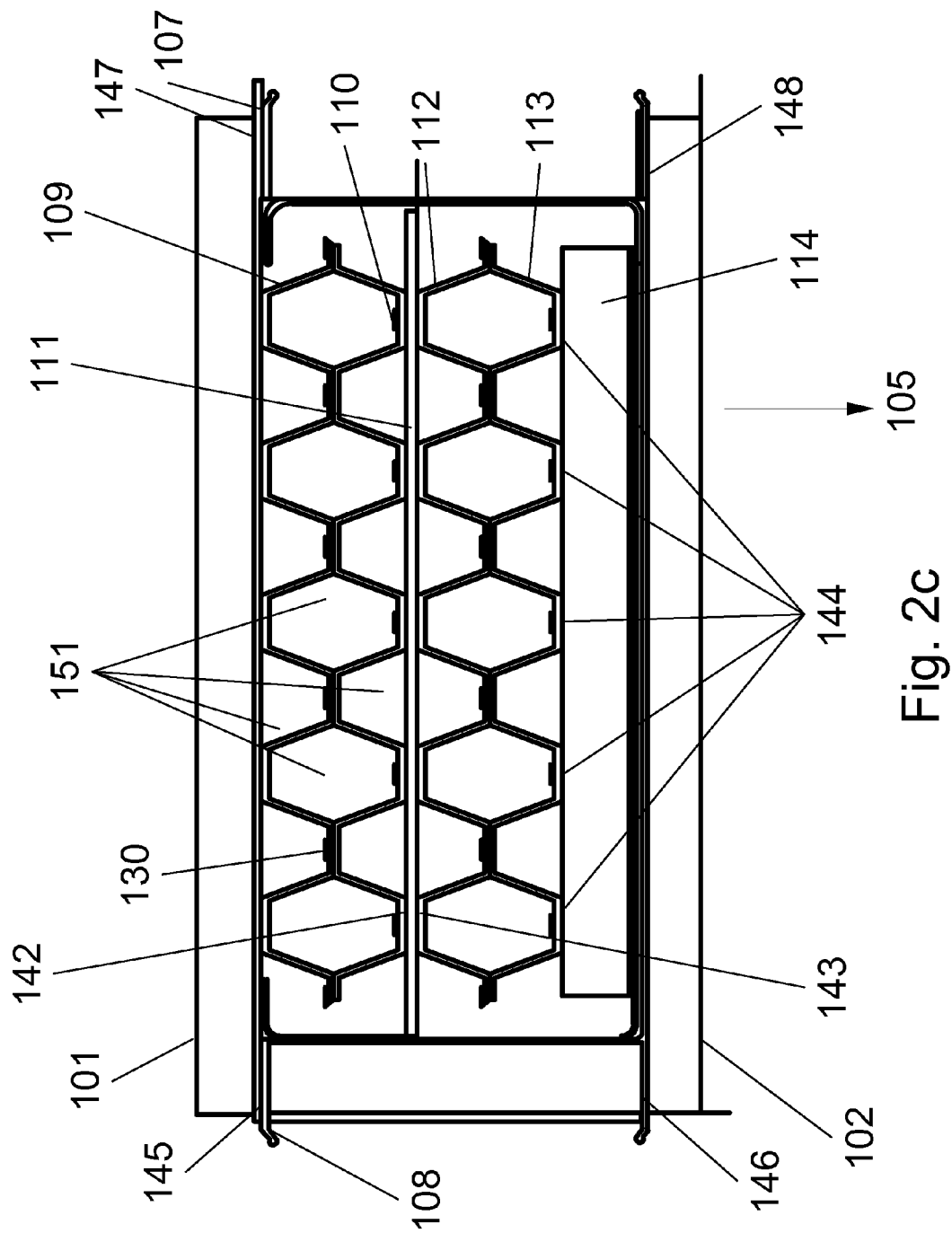
FIG. 2c depicts a top view of the first preferred embodiment of the modular building panel of the invention with the top plates of the invention removed exposing the corrugated panels, thermal panel, female snap channel, and male snap channel of the invention in which welds are utilized to attach the corrugated elements of the invention to one another.
Figure 2D:
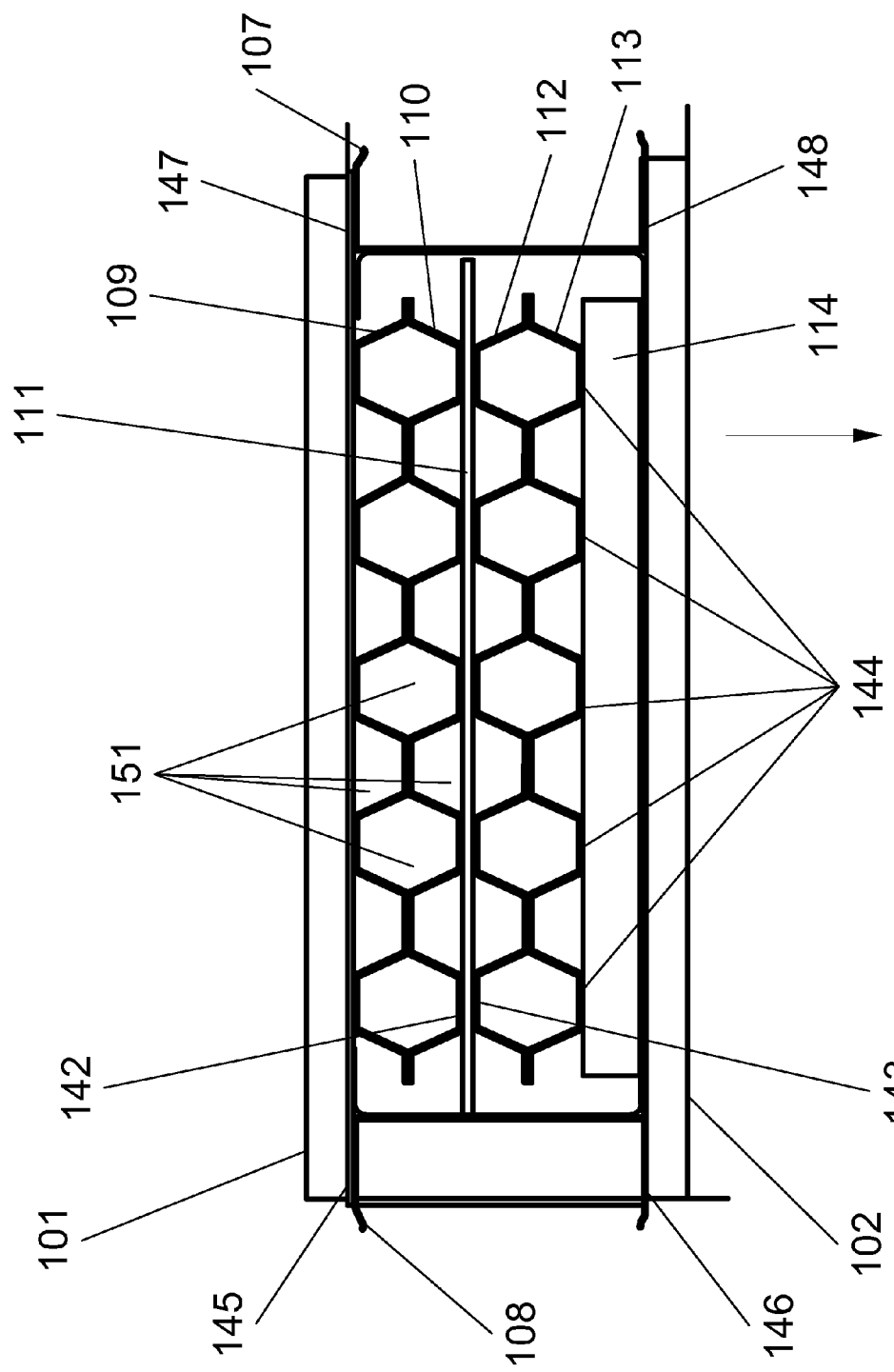
FIG. 2d depicts a top view of the first preferred embodiment of the modular building panel of the invention with the top plates of the invention removed exposing the corrugated panels, thermal panel, female snap channel, and male snap channel of the invention in which chemical bonding is utilized to attach the corrugated elements of the invention to one another.
Figure 2E:
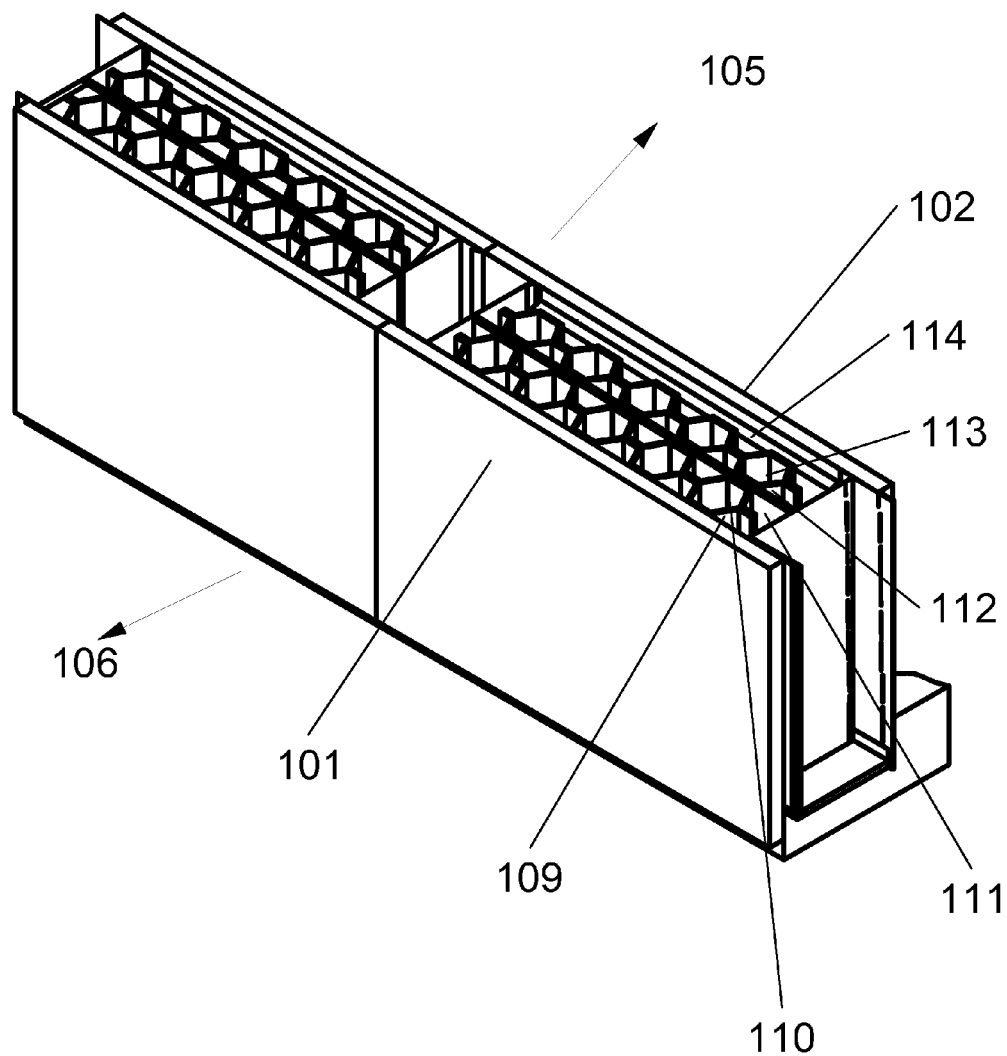
FIG. 2e depicts a perspective view of the first preferred embodiment of the modular building panel of the invention with the top cover plates removed.

Horizontal corrugated panel 114 also forms horizontal interstitial spaces 152 which are not shown in FIG. 2a but can be seen in FIG. 2e and FIG. 4 of the drawings. These horizontal interstitial spaces 152 may be utilized for the running of cabling such as may be required in a residential or commercial building application. The horizontal interstitial spaces 152 are natural horizontal spaces resulting from the structure of horizontal corrugated panel 114 which allow the horizontal running of electrical cabling, conduit, communications wiring, fiber optic cabling, plumbing, or any other infrastructure wiring, piping or the like which may be required to complete the construction of the building or other structure comprised of the modular building panels 100 of the invention.

Still referring to FIG. 2a, threaded fasteners 130 are shown as attachment means attaching first vertical corrugated panel 109 to second vertical corrugated panel 110 and also attaching third vertical corrugated panel 112 to fourth vertical corrugated panel 113. Threaded fasteners 130 may also attach second vertical corrugated panel 110 and third vertical corrugated panel 112 to thermal break panel 111 as shown. Likewise, threaded fasteners 130 may also attach fourth vertical corrugated panel 113 to horizontal corrugated panel 114.

Referring now to FIG. 2b, rivets 131 are shown as attachment means attaching first vertical corrugated panel 109 to second vertical corrugated panel 110 and also attaching third vertical corrugated panel 112 to fourth vertical corrugated panel 113. Rivets 131 may also attach second vertical corrugated panel 110 and third vertical corrugated panel 112 to thermal break panel 111 as shown. Likewise, rivets 131 may also attach fourth vertical corrugated panel 113 to horizontal corrugated panel 114.

Referring now to FIG. 2c, welds 132 are shown as attachment means attaching first vertical corrugated panel 109 to second vertical corrugated panel 110 and also attaching third vertical corrugated panel 112 to fourth vertical corrugated panel 113. Likewise, welds 132 may also attach fourth vertical corrugated panel 113 to horizontal corrugated panel 114.

Referring now to FIG. 2d, chemical bonding is shown attaching first vertical corrugated panel 109 to second vertical corrugated panel 110 and also attaching third vertical corrugated panel 112 to fourth vertical corrugated panel 113 at the surfaces where they meet as depicted. Likewise, chemical bonding may also attach fourth vertical corrugated panel 113 to horizontal corrugated panel 114 at the surfaces where they meet as depicted.

Referring now to FIG. 2e, a perspective view of the first preferred embodiment of the modular building panel of the invention with the top cover plates removed is depicted. Horizontal interstitial spaces 152 (not shown) which form horizontal raceways for running cabling, piping, and any other infrastructure as may be required by the building or other structure which is comprised of the modular building panel of the invention. First vertical corrugated panel 109 is attached to second vertical corrugated panel 110 forming a first honeycomb structure. Third vertical corrugated panel 112 is attached to fourth vertical corrugated panel 113 forming a second vertical honeycomb structure. The first and second vertical honeycomb structures are attached to first and second surfaces respectively of thermal break panel 111 as hereinbefore described area likewise fourth vertical corrugated panel 113 is attached to horizontal corrugated panel 114 as hereinbefore described area interior panel 102 faces the interior of the building or other structure 105, and exterior panel 101 faces the exterior of the building or other structure 106.

Figure 3:
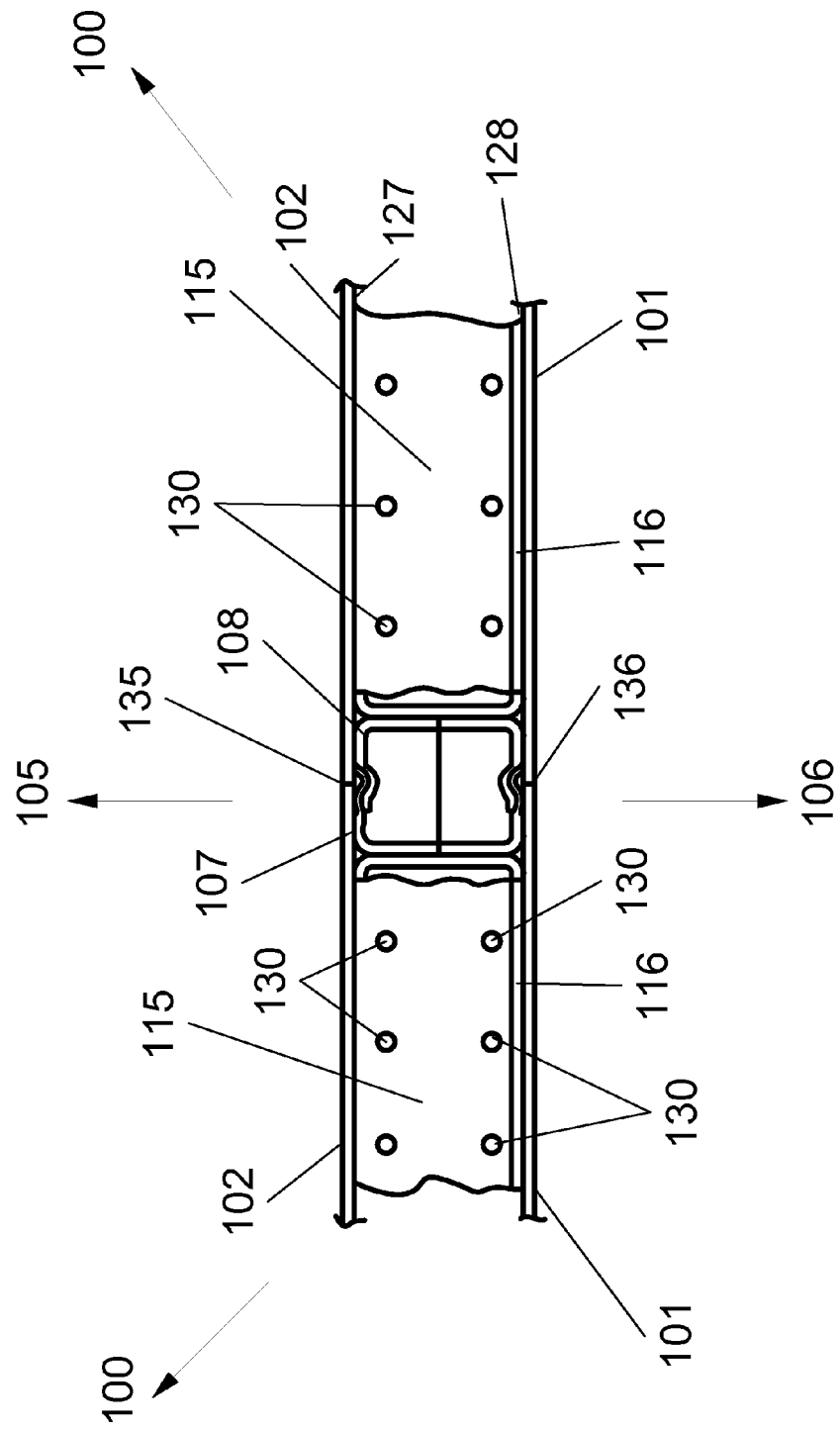
FIG. 3 depicts a top view of the first preferred embodiment of the modular building panel of the invention showing the top plates and top plate attachment means.

Referring now to FIG. 3, a top view of the first preferred embodiment of the modular building panel of the invention showing the top plates and top plate attachment means. First top plate 115 is attached to interior panel 102 interior surface 127 as shown in further detail in FIG. 4. Second top plate 116 is attached to exterior building panel 101 interior surface 128 as is shown in further detail in FIG. 4. The means of attachment of first top plate 115 to interior panel 100 to interior surface 127, and the attachment of second top plate 116 two exterior building panel 101 interior surface 128 may be any means known in the art but is preferably chemical bonding or threaded fasteners. Second top plate 116 is attached to exterior building panel 101 interior surface 128 in a location such that it is spaced down from the upper edge of exterior building panel 101 by a dimension that is substantially equivalent to the material thickness of top plate 115, so that when first top plate 115 is assembled onto the interior surface 127 of interior panel 102, the bottom surface of first top plate 115 may rest upon, or be insubstantial proximity to, the upper surface of second top plate 116. First top plate 115 and second top plate 116 are attached at a plurality of attachment points 130 by any attachment means known in the art which may be rivets, chemical bonding or threaded fasteners, but is preferably threaded fasteners in the form of sheet metal screws. The number of attachment means, for instance sheet metal screws, and the pattern of their location in first top plate 115 and second top plate 116 may be any pattern and any number, and is not to be construed as a limitation of the invention.

Still referring to FIG. 3, a first modular building panel of the invention 100 and a second modular building panel of the invention 100 are shown as being brought together with female snap channel 107 engaged with male snap channel 108 as is further depicted in detail in FIG. 5a. It can be seen from FIG. 3 that when female snap channel 107 is fully engaged with male snap channel 108 the interior panels 102 are brought together in substantial proximity to form a and interior butt joint 135. Likewise, when female snap channel 107 is engaged with male snap channel 108, exterior panels 101 are brought together in substantial proximity to form exterior butt joint 136. In this manner a plurality of modular building panels of the invention 100 may be assembled side-by-side and brought together, engaging female snap channels 107 with male snap channels 108 to form a contiguous wall containing interior butt joints 135 and exterior butt joints 136. Interior butt joints 135 and exterior butt joints 136 may then be finished by any means known in the art of concrete finishing or other exterior or interior wall finishing so as to present a smooth or other surface, such as a textured surface, on the interior and exterior surfaces of the building or other structure.

Still referring to FIG. 3, interior panels 102 face the interior of the building or other structure 105, and exterior panels 101 face the exterior of the building or other structure 106.

Referring now to FIG. 4a, a cross-sectional view of the first preferred embodiment of the modular building panel of the invention is depicted. Exterior panel 101 faces the exterior of the building or other structure 106, and interior panel 102 faces the interior of the building or other structure 105. First top plate 115 is attached to interior panel interior surface 127 by any means known in the art such as, for example, threaded fasteners, rivets or chemical bonding, and second top plate 116 is attached to exterior panel interior surface 128 by any means known as the art such as threaded fasteners, rivets or chemical bonding. Attachment means 130 attaches first top plate 115 to the upper surface of second top plate 116. Such attachments means may be for instance welding, chemical bonding, rivets, threaded fasteners or any means known in the art, but are preferably sheet metal screws 130 as shown in the figure. Horizontal corrugated panel 114, which contains horizontal interstitial spaces 152 which may be utilized to run cabling or piping, is attached to fourth vertical corrugated panel 113 at at least one third attachment surface 144. First vertical corrugated panel 109 and second vertical corrugated panel 110 are attached to create a first vertical honeycomb structure, and third vertical corrugated panel and forth vertical corrugated panel are attached to create a second vertical corrugated structure. The first and second vertical corrugated structures are attached to a first and second surface of thermal break panel 111 as hereinbefore described.

Figure 4B:
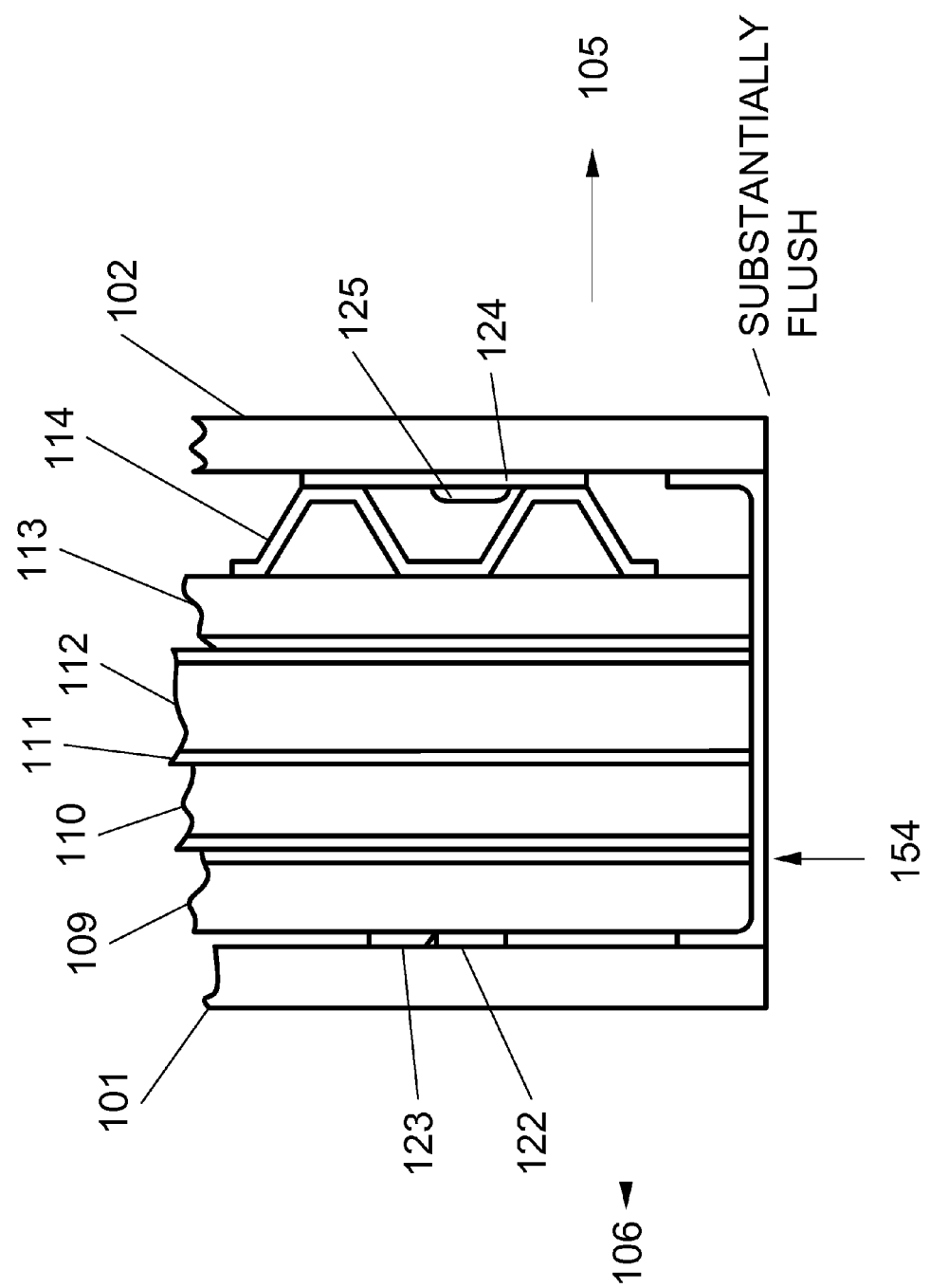
FIG. 4b depicts a cross-sectional view taken at the bottom of the first preferred embodiment of the modular building panel of the invention.

Referring now to FIG. 4b, a top view of the assembled male snap channel and female snap channel of the first preferred embodiment of the invention is depicted. Bottom plate 154 is utilized to create a closure to the bottom of the modular building panel of the invention. Bottom plate 154 may be shaped in the form of a U with its bottom surface substantially flush with the bottom edges of interior panel 102 and exterior panel 101 as depicted in FIG. 4b. The left side of the U-shape of bottom plate 154 is in contact with exterior panel interior surface 128, and the right side of the U-shaped a bottom plate 154 is in contact with interior panel interior surface 127. Bottom plate 154 may be attached to exterior panel interior surface 128 and interior panel interior surface 127 by any means known in the art but is typically threaded fasteners, chemical bonding or rivets. The bottom surfaces of first vertical corrugated panel 109, second vertical corrugated panel 110, third vertical corrugated panel 112, and fourth vertical corrugated panel 113 may extend down to the upper surface of bottom plate 154 as is shown in the figure, where they may be attached to bottom plate 154 by any means known in the art, including but not limited to welding, chemical bonding, threaded fasteners or rivets. In this manner a substantially closed flush surface is created for the modular building panel of the invention. Also depicted in FIG. 4b is horizontal corrugated panel 114 which is shown with its interior panel mounting bracket 124 and interior panel mounting clip 125, and exterior panel mounting strip 122 is shown with its exterior panel mounting clip 123. As described below, interior panel mounting bracket 124 is attached to horizontal corrugated panel 114 by any means known in the art for joining to planar surfaces such as, for example, chemical bonding, rivets, threaded fasteners or welding. Likewise exterior panel mounting strip 122 is attached to the flat surfaces of first vertical corrugated panel 109 by any means known in the art for joining to planar surfaces such as, for example, chemical bonding, rivets, threaded fasteners or welding. Interior panel mounting clip 125 is attached to interior panel 102 by any means known in the art including net but not limited to chemical bonding, threaded fasteners and rivets. It can be seen in FIG. 4 as well as described below and presented pictorially in FIG. 9b that interior panel mounting clip 125 securely attaches inner panel 102 to the modular building panel assembly by operation of interior panel mounting clips engagement with interior panel mounting bracket 124. Likewise, exterior panel mounting clips 123 are attached to exterior panel 101 by any means known in the art including but not limited to chemical bonding, threaded fasteners or rivets. It can be seen in FIG. 4 as well as described below and presented pictorially in FIG. 9a that exterior panel mounting clip 123 securely attaches exterior panel 101 to the modular building panel assembly by operation of exterior panel mounting clips 123 engagement with exterior panel mounting strip 122. In this manner interior panel 100 to and exterior panel 101 are securely attached to the modular building panel of the invention.

Referring now to FIG. 5a, a top view of the assembled male snap channel and female snap channel of the first preferred embodiment of the invention is depicted. Female snap channel 107 is attached to interior panel 101 interior surface 127, and is also attached to exterior panel 102 at exterior panel interior surface 128. The means of attachment of female snap channel 107 to interior panel interior surface 127 and exterior panel interior surface 128 is any means known in the art but may be, for instance, chemical bonding, rivets or threaded fasteners. Female snap channel 107 comprises female snap channel retaining chevrons 118 which are formed into female snap channel 107 and are received by male snap channel receiving chevrons 119 formed in male snap channel 118 as shown in FIG. 5a. Male snap channel steps 120 are formed in male snap channel 108 so that male snap channel 108 may be attached to interior panel interior surface 127 and exterior panel interior surface 128 by any means known in the art such as, for instance, chemical bonding, rivets or threaded fasteners. Step 120 formed in male snap channel 108 provides additional flexure and allows contact between male snap channel 108 and interior panel interior surface 127.

Still referring to FIG. 5a, first support channel 133 is configured to be in contact with and attached to interior panel interior surface 127, exterior panel interior surface 128, and female snap channel rear surface 160. It can be seen that first support channel 133 provides structural rigidity to the modular building panel and provides support for female snap channel 107 as male snap channel 108 is moved into position such that female snap channel retaining chevron 118 is engaged with male snap channel receiving chevron 119. Likewise, second support channel 134 is configured to be in contact with and attached to interior panel interior surface 127, exterior panel interior surface 128, and male snap channel rear surface 161. The method of attachment of first support channel 133 to interior panel interior surface 127 and exterior panel interior surface 128, and the method of attachment of second support channel 134 to interior panel interior surface 127 and exterior panel interior surface 128 is any means known in the art including but not limited to chemical bonding, rivets and threaded fasteners. The method of attachment of first support channel 133 two female snap channel rear surface 160, and the method of attachment of second support channel 134 to male snap channel rear surface 161 is any means known in the art including but not limited to chemical bonding, threaded fasteners, rivets, welding including spot welding, or any other means known in the art for joining planar surfaces.

Referring now to FIG. 5b, the engagement of male snap channel 108 into and being received by female snap channel 107 is depicted. For reference, the interior panels 102 of two modular building panels which are desired to be assembled together are shown in the figure, as are the exterior panels 101. As hereinbefore described, male snap channel 108 is attached to interior panel 102 and exterior panel 101 of the right hand modular building panel of the invention, and female snap channel 107 is attached to interior panel 102 and exterior panel 101 of the left-hand modular building panel of the invention as hereinbefore described. It can be seen that each modular building panel of the invention comprises a front side, a backside, a top, a bottom, a left-hand side and the right hand side. Male snap channel 108 is shown in the figures of the drawings as installed on the right-hand side of the modular building panel of the invention, and female snap channel 107 is shown in the figures of the drawings as installed on the left-hand side of the modular building panel of the invention.

It is to be understood that, in an alternate embodiment, male snap channel 108 may be installed on the left-hand side of the modular building panel of the invention, and female snap channel 107 may be installed on the right-hand side of the modular building panel of the invention. Each modular building panel of the invention comprises female snap channel 107 on one of its sides and male snap channel 108 on the other. For consistency sake, the figures of the drawings show male snap channel 108 installed on the right-hand side of the modular building panel of the invention and female snap channel 107 installed on the left-hand side of the modular building panel of the invention.

Still referring to FIG. 5b, is desired that the modular building panel shown on the left hand side of the drawing be connected and joined with to the modular building panel shown on the right-hand side of the drawing. The modular building panel shown on the right-hand side of the drawing is moved towards the modular building panel shown on the left-hand side of the drawing in the direction of arrows A such that male snap channel 108 engages with female snap channel 107. As male snap channel interior distal end 137 engages female snap channel retaining chevron 118, male snap channel interior distal end 137 is flexed inward in the direction of arrow B1 and male snap channel exterior distal end 138 is flexed in the direction of arrow B2. As the right-hand modular building panel continues to move towards full engagement in the direction shown of arrows A, male snap channel exterior distal end passes over female snap channel retaining chevron 118 on the interior side of the channel, and male snap channel exterior distal end passes over female snap channel chevron 118 on the exterior side of the channel. As male snap channel receiving chevrons 119 pass over female snap channel retaining chevrons 118, male snap channel interior distal end 137 and male snap channel exterior distal end 138 snap back into place such that female snap channel retaining chevrons 118 are fully engaged with and retained by male snap channel receiving chevrons 119. It can be seen that the engagement of female snap channel retaining chevrons 118 with male snap channel receiving chevrons 119 holds the two building panels firmly in place as depicted in the completed assembly view of two assembled modular building panels as depicted in FIG. 5a, and also resulting in interior butt joint 135 and exterior butt joint 136 as depicted in FIG. 5a. In this manner to adjacent building panels are retained together, and a plurality of modular building panels can thus be assembled side-by-side to form a contiguous wall comprising modular building panels of the invention.

Referring now to FIG. 6, a perspective view of the assembled male snap channel and female snap channel of the first preferred embodiment of the invention is depicted. As hereinbefore discussed, female snap channel 107 is engaged with male snap channel 108 by operation of the retention of female snap channel retaining chevron 118 with male snap channel receiving chevron 119. First support channel 133 is attached to interior panel interior surface 127 and also attached to female snap channel rear surface 160 as hereinbefore described. Second support channel 134 is attached to interior panel interior surface 127 and male snap channel rear surface 161 as hereinbefore described. This perspective view provides another view of the retention of two modular panels by virtue of the engagement of female snap channel retaining chevron 118 and male snap channel retaining chevron 119.

Figure 7A:
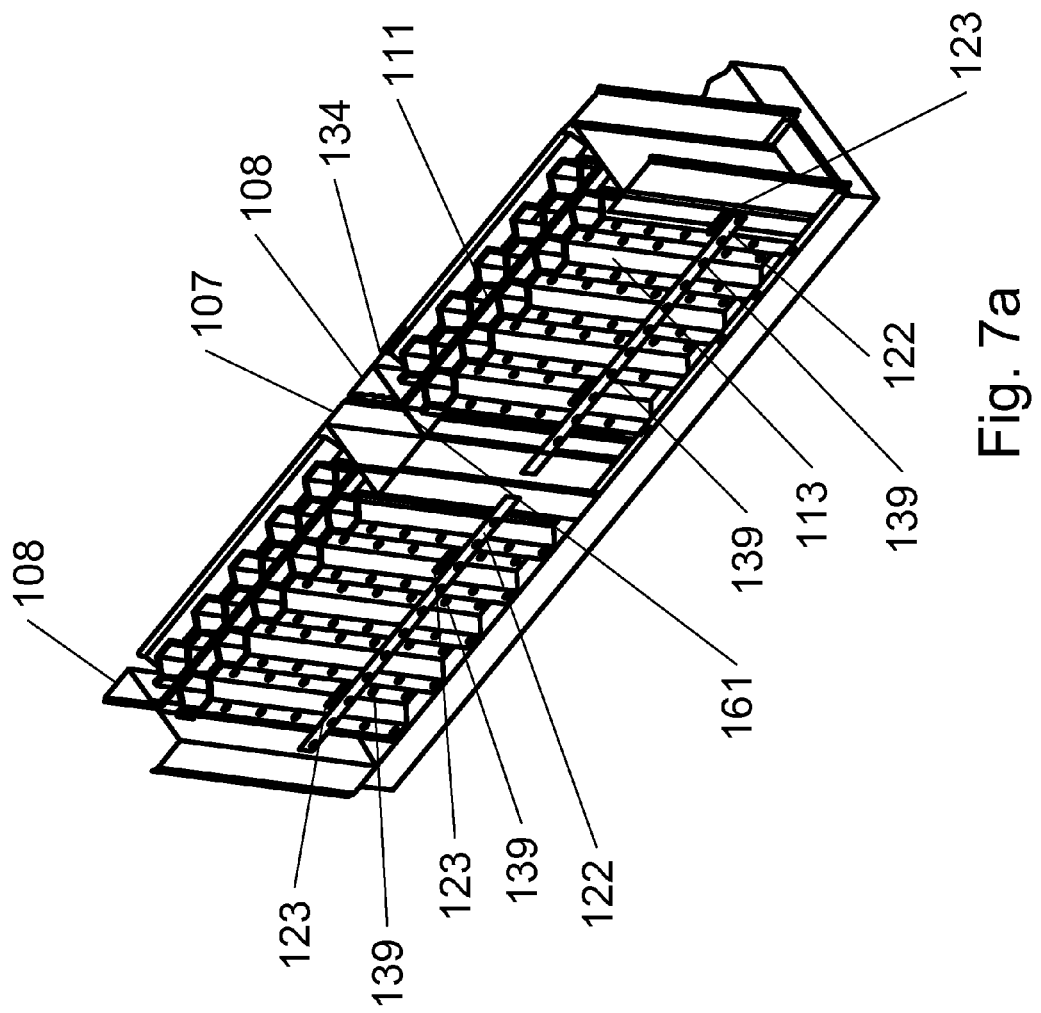
FIG. 7a depicts a perspective view of the first preferred embodiment of the invention with external cladding removed and internal cladding removed, further depicting the exterior panel mounting strip of the first preferred embodiment of the invention.

Referring now to FIG. 7a, a perspective view of the first preferred embodiment of the invention with external cladding removed and internal cladding removed, further depicting the exterior panel mounting strip of the first preferred embodiment of the invention is depicted. In the view shown in FIG. 7a, two modular building panels of the invention are shown assembled onto a foundation surface such as a monolithic slab. It can be seen that the modular building panels of the invention are in contact with and reside in foundation step 104, and that exterior panel foundation overlap 121 which is created by the extension of exterior panel 101 below the surface of foundation step 104. It is preferred that exterior panel 101 interior surface 128 the substantially in contact with the foundation outer surface 117 when the modular building panels of the invention are residing in foundation step 104 such that interior panel 102 is in contact with foundation step vertical surface 129.

Still referring to FIG. 7a, two modular building panels are depicted as assembled together with some elements removed for clarity sake and to show exterior panel mounting strip 122. The right-hand side modular building panel of the invention is shown with exterior panel 101 and interior panel 102 removed. It can be seen that exterior panel mounting strip 122 runs substantially horizontally and is attached to outer surfaces of fourth vertical corrugated panel 113. The means of attachment of exterior panel mounting strip 122 to fourth vertical corrugated panel 113 may be any means known in the art but may include any attachment means that results in a flush surface on the outer surface of mounting strip 122 which is in contact with exterior panel interior surface 128 (not shown in the figure). The means of attachment of exterior panel mounting strip 122 to fourth vertical corrugated panel 113 at exterior horizontal mounting strip attachment points 139 may be spot welding, chemical bonding or any attachment means known in the art that results in a flush surface on the outer surface of exterior panel mounting strip 122. Thermal break panel 111 is depicted as located between first vertical honeycomb structure and second vertical honeycomb structure formed by vertical corrugated panels 109 and 110 and vertical corrugated panels 112 and 113, respectively. First support channel 133 (not shown in the figure) is attached to the interior surface of exterior panel 128 (not shown in the figure) as hereinbefore described, and female snap channel 107 is engaged with male snap channel 108. Second support channel 134 is shown as attached to male snap channel rear surface 161 as hereinbefore described.

Still referring to FIG. 7a, exterior panel 101 (not shown in the figure) is assembled on to the modular wall panel assembly of the invention by virtue of a plurality exterior panel mounting clips 123 that are attached to exterior panel interior surface 128 (not shown in the figure) and are adapted to slide over exterior panel mounting strip 122 so as to retain exterior panel 101 in place. Exterior panel mounting clips 123 are further depicted in FIG. 9a. Exterior panel mounting clips may be attached to exterior panel interior surface 128 by any means known in the art including but not limited to threaded fasteners, rivets and chemical bonding. It can be seen that exterior panel mounting strip 122 runs substantially horizontally and is attached to outer surfaces of fourth vertical corrugated panel 113. The means of attachment of exterior panel mounting strip 122 to fourth vertical corrugated panel 113 may be any means known in the art but may include any attachment means that results in a flush surface on the outer surface of mounting strip 122 which is in contact with exterior panel interior surface 128 (not shown in the figure). The means of attachment of exterior panel mounting strip 122 to fourth vertical corrugated panel 113 at exterior horizontal mounting strip attachment points 139 may be spot welding, chemical bonding or any attachment means known in the art that results in a flush surface on the outer surface of exterior panel mounting strip 122.

Figure 7B:
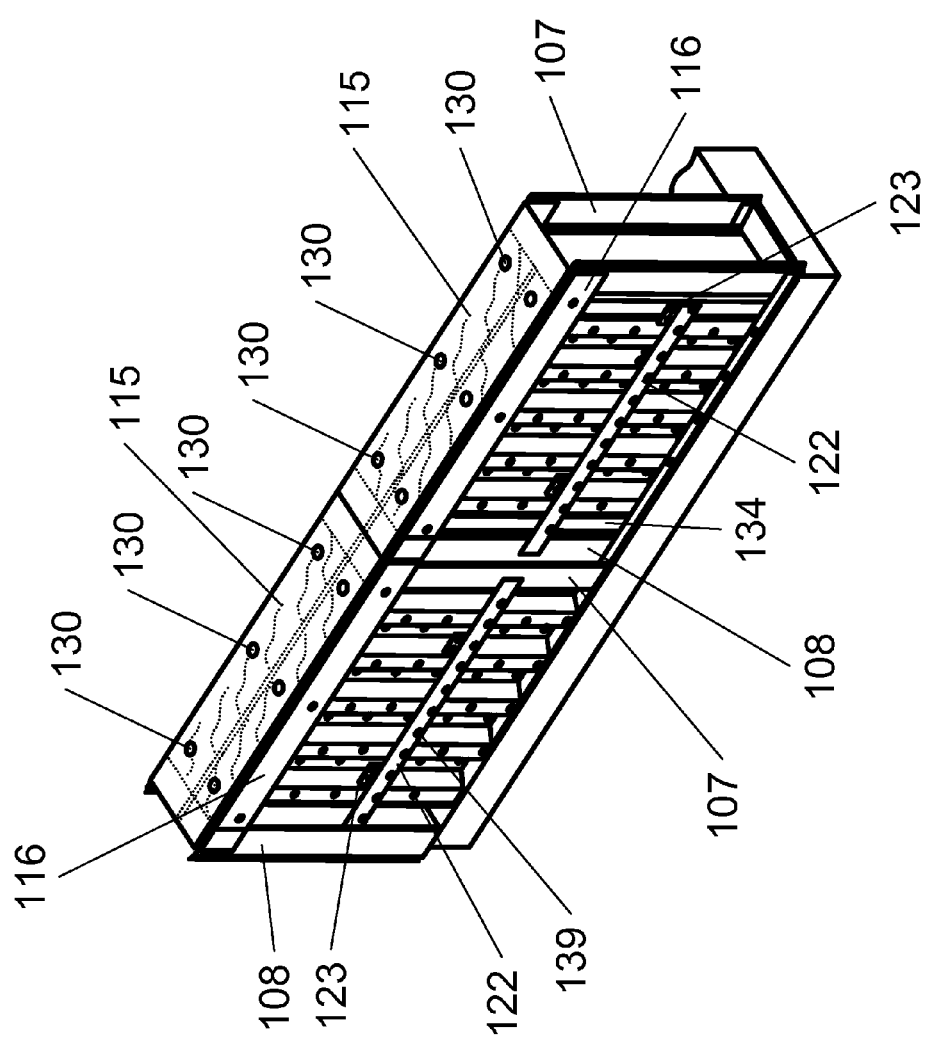
FIG. 7b depicts a perspective view of further detail regarding the placement of the first and second top plates of the invention in the first preferred embodiment.

Referring now to FIG. 7b, a perspective view of the first preferred embodiment of the invention the depicting further detail regarding the placement of the first and second top plates of the invention in the first preferred embodiment. In this view, first top plate 115 and second top plate 116 are depicted as located at the top of the modular building panel of the invention and attached using any means in the art, but preferably a plurality of screws 130. The modular building panels of the invention are shown with exterior panel 101 and interior panel 102 removed. Second support channel 134 is attached to interior panel interior surface 127 (not shown in the figure) and male snap channel rear surface 161 (not shown in the figure) as hereinbefore described. This perspective view provides a view of the retention of two modular panels by virtue of the engagement of female snap channel retaining chevron 118 and male snap channel retaining chevron 119 (not shown in the figure but present as features of female snap channel 107 and male snap channel 108 as hereinbefore described).

Still referring to FIG. 7b, exterior panel 101 (not shown in the figure) is assembled on to the modular wall panel assembly of the invention by virtue of a plurality exterior panel mounting clips 123 that are attached to exterior panel interior surface 128 (not shown in the figure) and are adapted to slide over exterior panel mounting strip 122 so as to retain exterior panel 101 in place. Exterior panel mounting clips 123 are further depicted in FIG. 9a.

Figure 8:
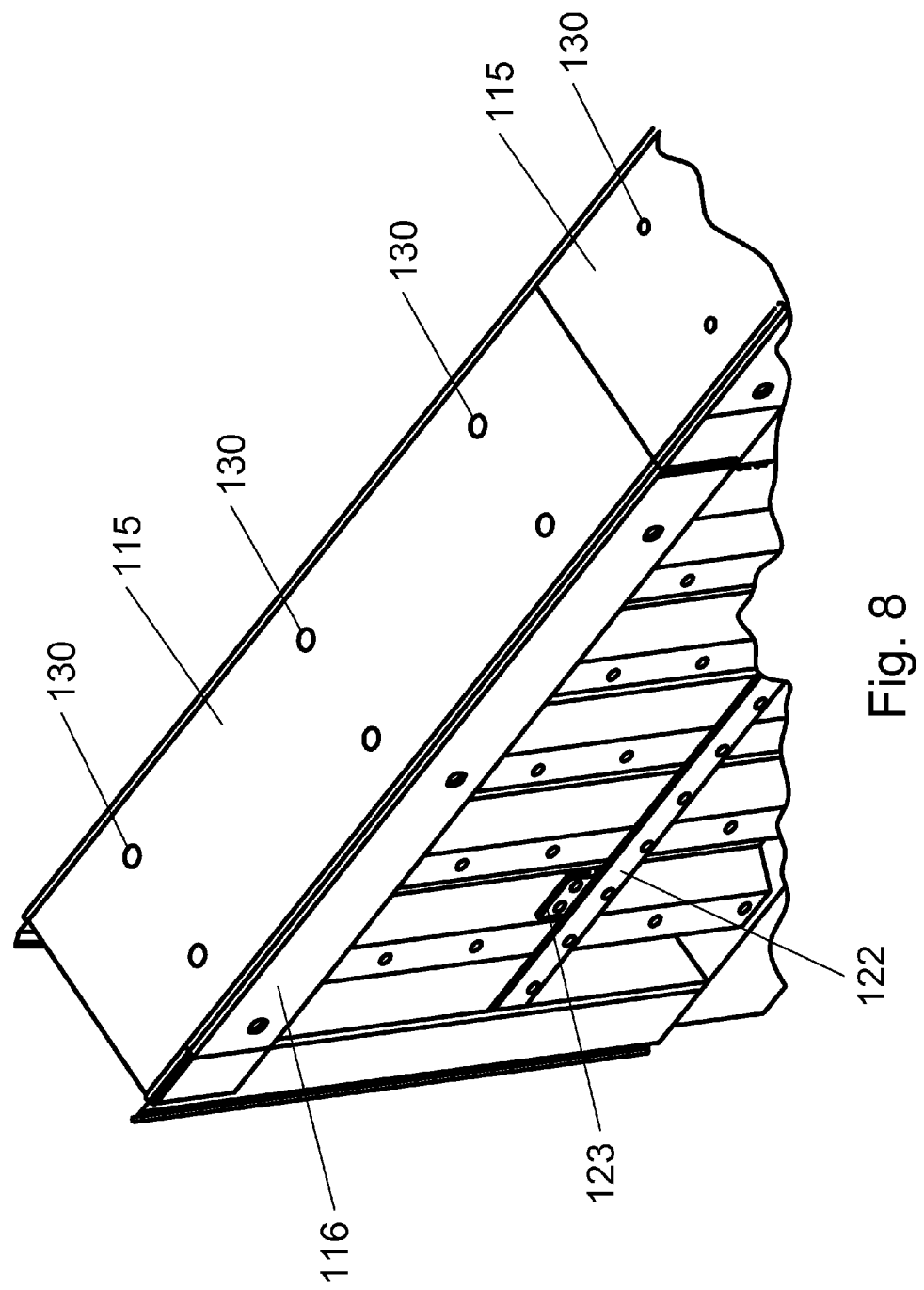
FIG. 8 depicts a perspective view of the first preferred embodiment of the invention depicting placement and attachment of the top plates of the invention.

Referring now to FIG. 8, a perspective view of the first preferred embodiment of the invention depicting placement and attachment of the top plates of the invention is depicted. Threaded fasteners 130 are utilized to attach first top plate 115 to second top plate 116 as hereinbefore described at a plurality of attachment points. Second top plate 116 is attached to the interior surface of exterior panel 128 at a plurality of attachment points 149 utilizing threaded fasteners, or alternatively second top plate 116 may be attached to interior surface of exterior panel 128 by chemical bonding where second top plate 116 is in contact with exterior panel interior surface 128 as depicted more clearly in FIG. 4. Likewise, first top plate 115 is attached to the interior surface of interior panel 127 at a plurality of attachment points 149 (not shown in FIG. 8) utilizing threaded fasteners, or alternatively first top plate 115 may be attached to interior surface of interior panel 127 by chemical bonding where first top plate 115 is in contact with interior panel interior surface 127 as depicted more clearly in FIG. 4. Still referring to FIG. 8, exterior panel 101 (not shown in the figure) is assembled on to the modular wall panel assembly of the invention by virtue of a plurality exterior panel mounting clips 123 that are attached to exterior panel interior surface 128 (not shown in the figure) and are adapted to slide over exterior panel mounting strip 122 so as to retain exterior panel 101 in place. Exterior panel mounting clips 123 are further depicted in FIG. 9a.

Figure 9A:
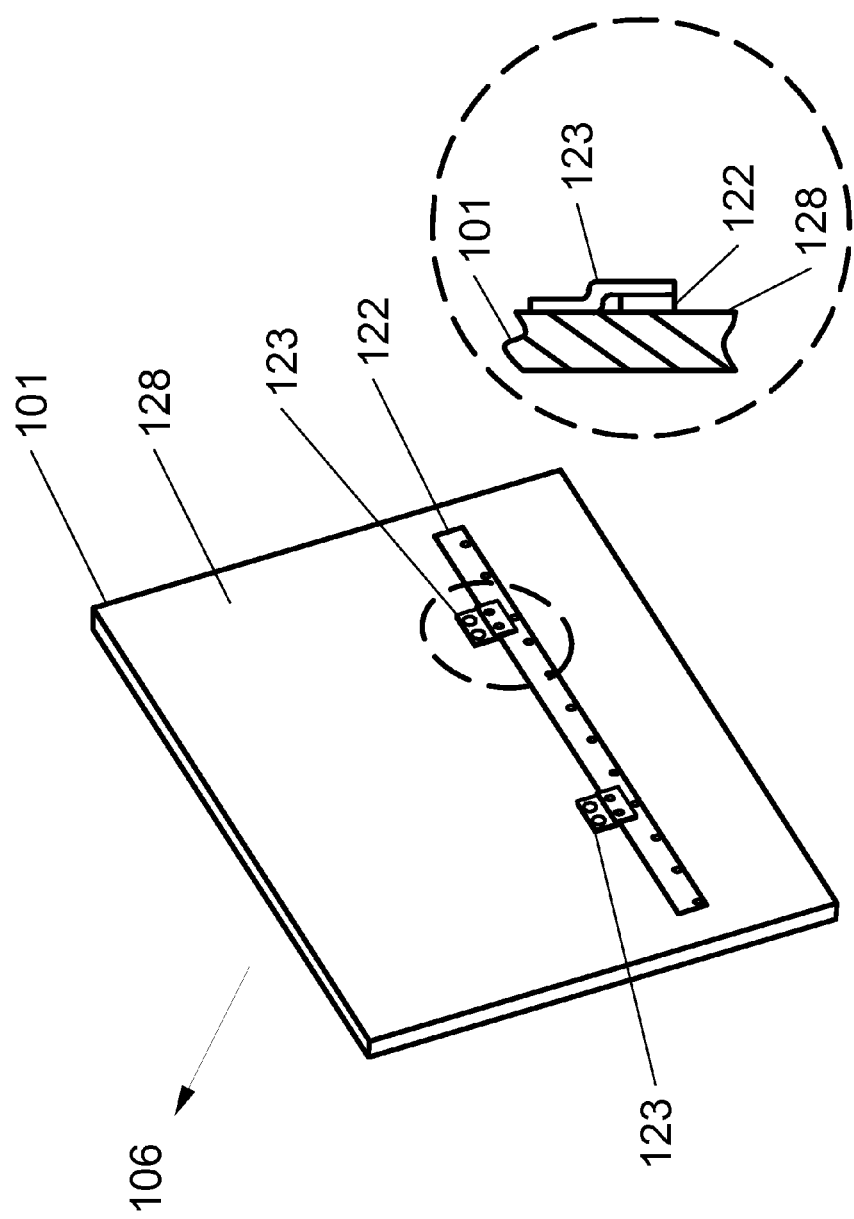
FIG. 9a depicts a cross-section view of the exterior panel mounting clip and exterior panel mounting strip of the first preferred embodiment of the invention.

Referring now to FIG. 9a, the exterior panel mounting clip and exterior panel mounting strip of the first preferred embodiment of the invention are depicted. A plurality of exterior panel mounting clips 123 may be attached to exterior panel interior surface 128 by any means known in the art such as, for example, chemical bonding or threaded fasteners. Exterior panel mounting strip 122 is attached to the outer surface of fourth vertical corrugated panel 113 (not shown in the figure) by any means known in the art such as, for example, chemical bonding, threaded fasteners, rivets, or welding. Exterior panel mounting clips 123 are located so that exterior panel 101 may be placed in a slightly elevated position resting against exterior panel mounting strip 122, whereupon it may be translated downwards such that the plurality of exterior panel mounting clips 123 slide over and engage exterior panel mounting strip 122, retaining outer panel 101 in place as depicted in the figures of the drawings. Exterior panel mounting clips 123 are located horizontally so as to engage exterior panel mounting strip 122 at locations where the corrugated cross section of fourth vertical corrugated panel 113 creates a void on the interior side of exterior panel mounting strip 122. The modular building panel of the invention may comprise a plurality of exterior panel mounting strips 122 and may be, for instance, spaced on exterior panel interior surface with vertical separation so as to provide more robust retention of outer panel 101 to the modular building panel of the invention. Any number of exterior panel mounting strips 122 may be used as required in specific environmental conditions or high load conditions in which stronger retention of exterior panel 101 onto exterior panel mounting strips 122 is desired. Each row of exterior panel mounting clips 123 maybe substantially horizontal, and exterior panel mounting clips are located on exterior panel inner surface 128 so as to engage exterior panel mounting strips 122 such that when engaged, exterior panel 101 is located as shown in the figures of the drawings. Exterior panel mounting clips 123 may engage exterior panel mounting strip 122 with a sliding engagement with a slight press fit. If a plurality of exterior panel mounting strips 122 are utilized in the invention, a corresponding plurality of horizontal rows of exterior panel mounting clips 123 are also utilized. The exterior of the building is depicted by arrow 106.

Figure 9B:
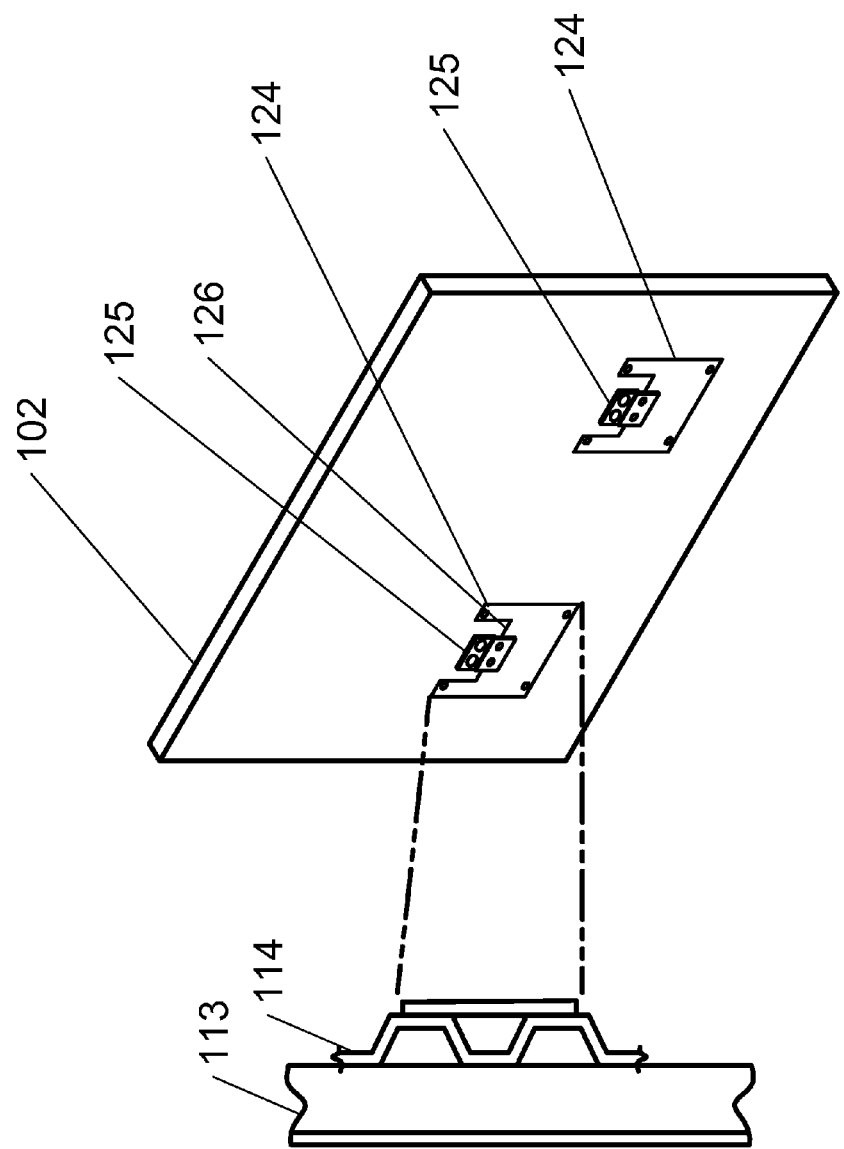
FIG. 9b depicts the interior panel mounting bracket and interior panel mounting clip of the first preferred embodiment of the invention.

Referring now to FIG. 9b, interior panel mounting brackets 124 and interior panel mounting clips 125 of the first preferred embodiment of the invention are depicted. Interior panel mounting clips 125 engage interior panel mounting brackets 124 preferably in a slight press fit. Preferably, a plurality of interior panel mounting clips 125 engage interior panel mounting brackets 124. Interior panel mounting brackets 124 are attached to the surfaces of horizontal corrugated panel 114 as shown in the figure. Fourth vertical corrugated panel 113 is shown for reference. Interior panel mounting brackets 124 may be attached to horizontal corrugated panel 114 by any means known in the art which may include, for example, chemical bonding, flush rivets, flathead screws, spot welding, or any other attachment means known in the art. Interior panel mounting clips 125 are attached to interior panel 102 interior panel interior surface 127 by any means known in the art which may include, for example, chemical bonding and threaded fasteners. Interior panel mounting clip 125 width is less than cut out of interior panel mounting bracket 124, such that the interior panel mounting clip 125 may slidingly engage interior panel mounting bracket 124 in a slight press fit, coming to rest on interior panel mounting bracket support surface 126. This is further depicted in FIG. 9C.

Still referring now to FIG. 9b, the interior panel mounting brackets 124 are attached to horizontal corrugated panel 114 at attachment points which may be any means known for attachment in the art including chemical bonding, spot welding, flush had rivets, countersunk screws or any other means for mechanical attachment. Interior panel mounting clips 125 engage interior panel mounting brackets 124 in a sliding engagement so that when interior panel 102 is placed against interior panel mounting brackets 124 such that interior panel mounting clips 125 are substantially aligned with the receiving cutouts in interior panel mounting brackets 124, interior panel 102 may slide down into place by operation of a sliding engagement between interior panel mounting clips 125 and interior panel mounting brackets 124. More than one row of interior panel mounting brackets 124, spaced vertically apart, may be attached to horizontal corrugated panel 114 and, likewise, corresponding rows of interior panel mounting clips 125, spaced correspondingly vertically apart may be located on interior panel interior surface 127 so as to engage corresponding interior panel mounting brackets 124. Interior panel mounting clips 125 and interior panel mounting brackets 124 may be arranged in substantially horizontal rows and are located such that when interior panel 102 is placed against interior panel mounting brackets 124 and translated downwards such that interior panel mounting clips 125 engage interior panel mounting bracket 124, interior panel 102 is located as shown in the figures of the drawings with its top surface substantially flush with the top surface of exterior panel 101 and its bottom surface substantially flush with the bottom of modular building panel 100 as is shown, for instance, in FIG. 1*b* and also in FIG. 10.

Figure 10:
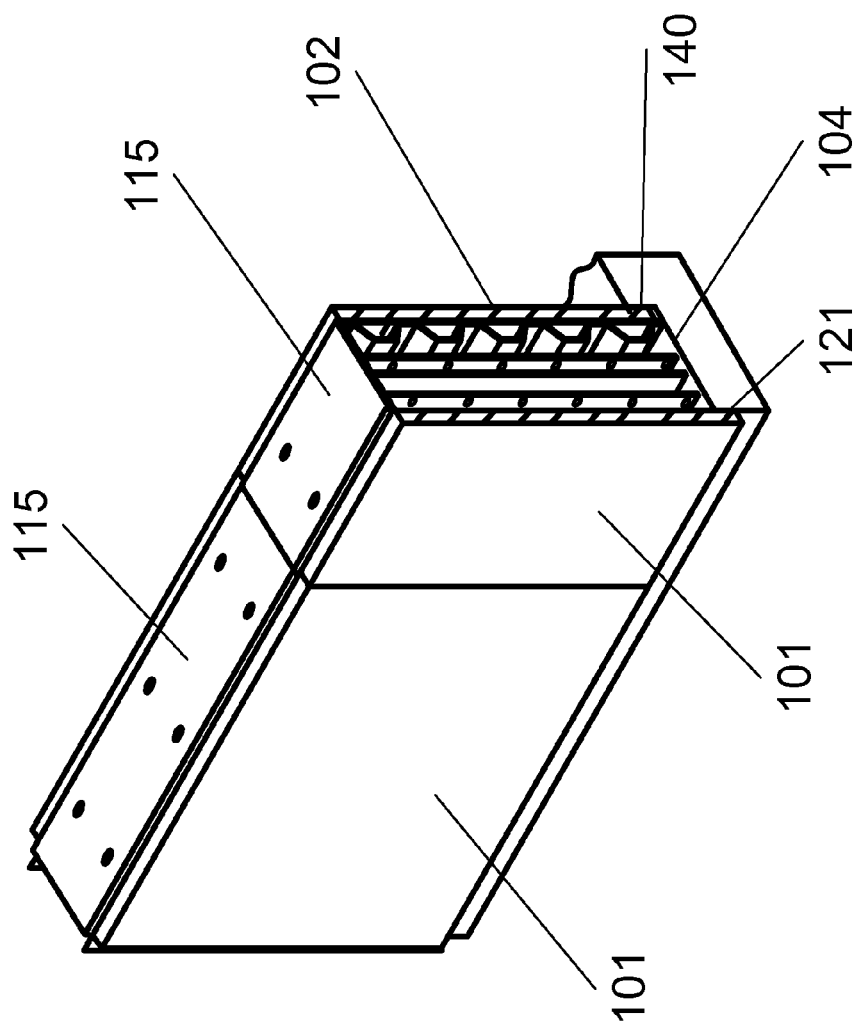
FIG. 10 depicts a perspective view of a cross-section of the first preferred embodiment of the invention depicting the orientation of the components of the modular building panel of the invention and further showing the exterior cladding foundation overlap of the first preferred embodiment of the invention.

Referring now to FIG. 10, a perspective view of a cross-section of the first preferred embodiment of the invention depicting the orientation of the components of the modular building panel of the invention and further showing the exterior cladding foundation overlap of the first preferred embodiment of the invention is depicted. Exterior panel foundation overlap 121 is formed by the extension of exterior panel 101 as hereinbefore described. Interior panel 102 is substantially in contact with foundation step wall 140 which is a part of foundation step 104 as hereinbefore described. First top plate 115 is substantially flush with the upper surfaces of interior panel 102 and exterior panel 101 to form a substantially flush top surface of the modular building panel of the invention.

FIGS. 1 through 10 of the drawings depict a first preferred embodiment of the modular building panel of the invention in which a first vertical honeycomb structure and second vertical honeycomb structure are brought together with a thermal break panel 111 between them, and further comprising horizontal corrugated panel 114 which, along with interior panel 102 and exterior panel 101 form a first preferred embodiment of the modular building panel of the invention. An alternate embodiment of the invention which comprises a further fifth vertical corrugated panel 200 is depicted in FIGS. 11A through 15.

Figure 11A:
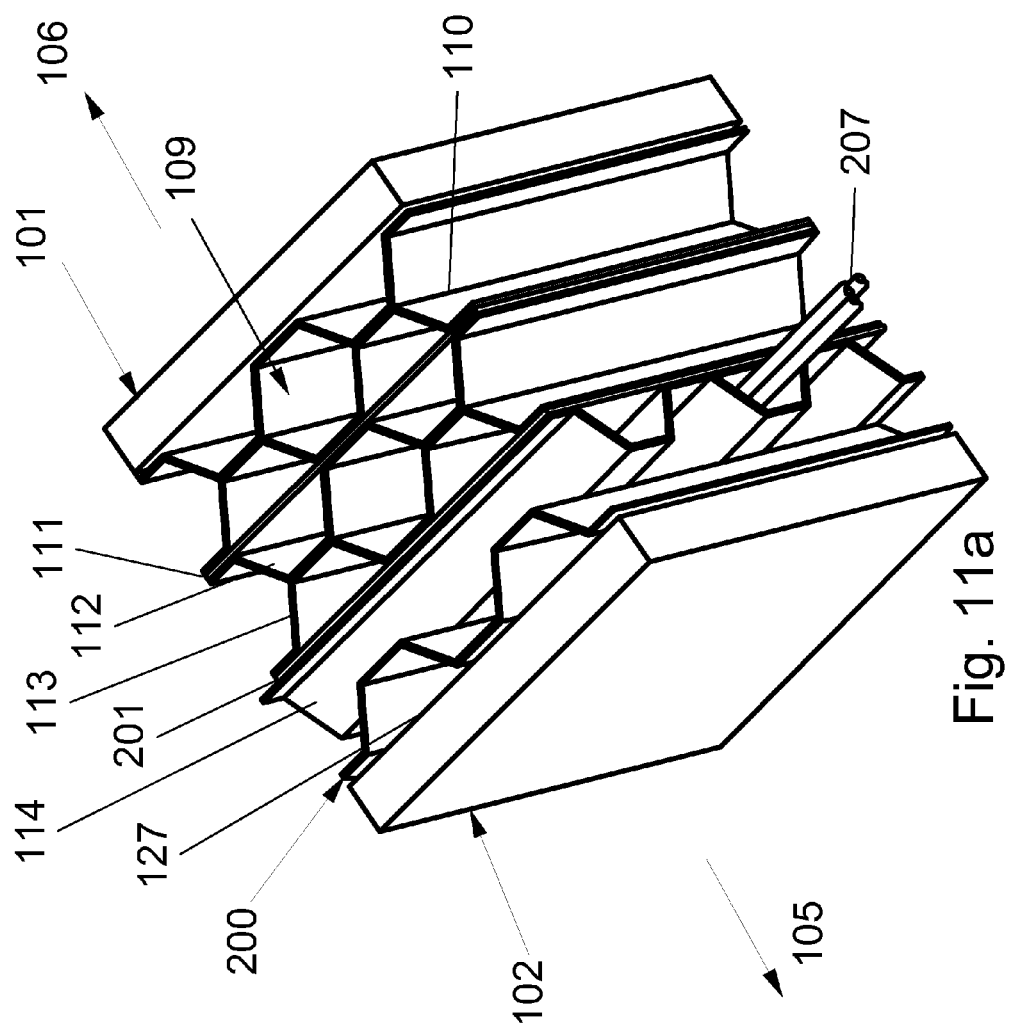
FIG. 11a depicts a perspective cross-section view of an alternate embodiment of the improved modular building panel of the invention, with the interstitial spaced containing air.

Referring now to FIG. 11*a*, a perspective cross-section view of an alternate embodiment of the improved modular building panel of the invention, with the interstitial spaced containing air is depicted. In the alternate embodiment depicted in FIG. 11*a*, fifth vertical corrugated panel 200 is attached to horizontal corrugated panel 114 where the surfaces of the corrugations meet as shown in the figure. Fifth vertical corrugated panel 200 may be attached to horizontal corrugated panel 114 by any means known in the art including but not limited to chemical bonding, spot welding, rivets, threaded fasteners, and any other means known in the art for joining planar surfaces. Fifth vertical corrugated panel 200 is also attached to interior panel interior surface 127 where the surfaces of fifth vertical corrugated panel 200 come into contact with interior panel interior surface 127 as shown in the figure by any means known in the art including but not limited to chemical bonding, rivets and threaded fasteners. In this alternate embodiment, exterior panel 101, first vertical corrugated panel 109, second corrugated panel 110, thermal break 111, third vertical corrugated panel 112, and fourth vertical corrugated panel 113 are oriented and attached to one another in the same manner and by any of the means as hereinbefore described. In the alternate embodiment depicted in FIG. 11*a*, second thermal break panel 201 is located between and attached to fourth vertical corrugated panel 113 and horizontal corrugated panel 114. The addition of second thermal break panel 201 and fifth vertical corrugated panel 200 in this alternate embodiment provide additional structural benefits and also provides improved insulative properties for the modular building panel of the invention. Cabling and/or piping 207, which may include electrical wiring, communications wiring, fiber optic cables, water pipes, ethernet cable, or any other infrastructure cabling or piping may run through the horizontal interstitial spaces of horizontal corrugated panel 114 as depicted in FIG. 11*a*.

Figure 11B:
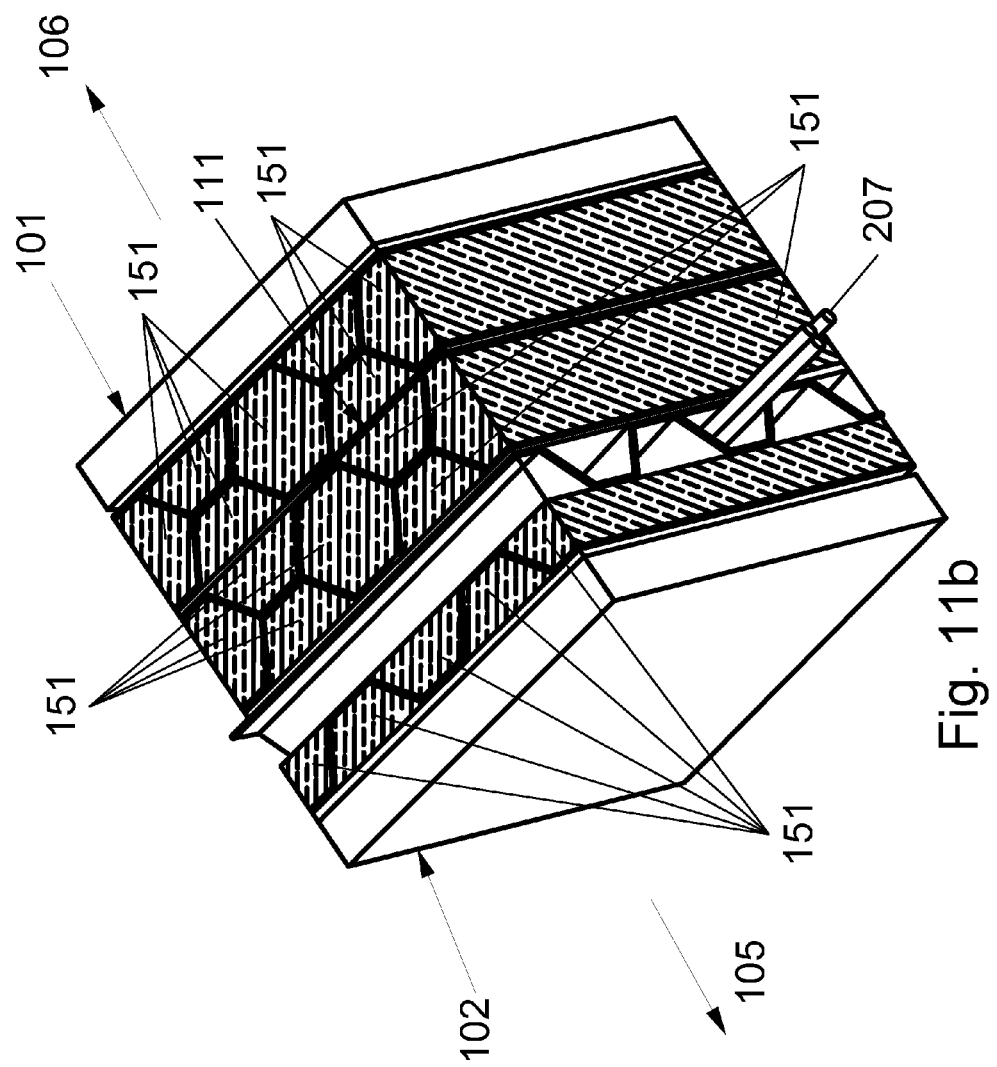
FIG. 11b depicts a perspective cross-section view of an alternate embodiment of the improved modular building panel of the invention, with the vertical interstitial spaces containing a filler material.

Referring now to FIG. 11*b*, a perspective cross-section view of an alternate embodiment of the improved modular building panel of the invention, with the vertical interstitial spaces containing an interstitial filler material 153 in vertical interstitial spaces 151. All or only a few of vertical interstitial spaces 151 may be filled with interstitial filler material 153. It is preferred that horizontal interstitial spaces 152 not be filled with interstitial filler material 153 in order to allow cabling and piping 207 to run through any of the horizontal interstitial spaces 152. Exterior panel 101 faces the exterior of the building or other structure as shown by arrow 106, and interior panel 102 faces the interior of the building or structure in direction 105. Thermal break panel 111 is located between the first vertical honeycomb structure and the second vertical honeycomb structure as hereinbefore described.

Figure 12:
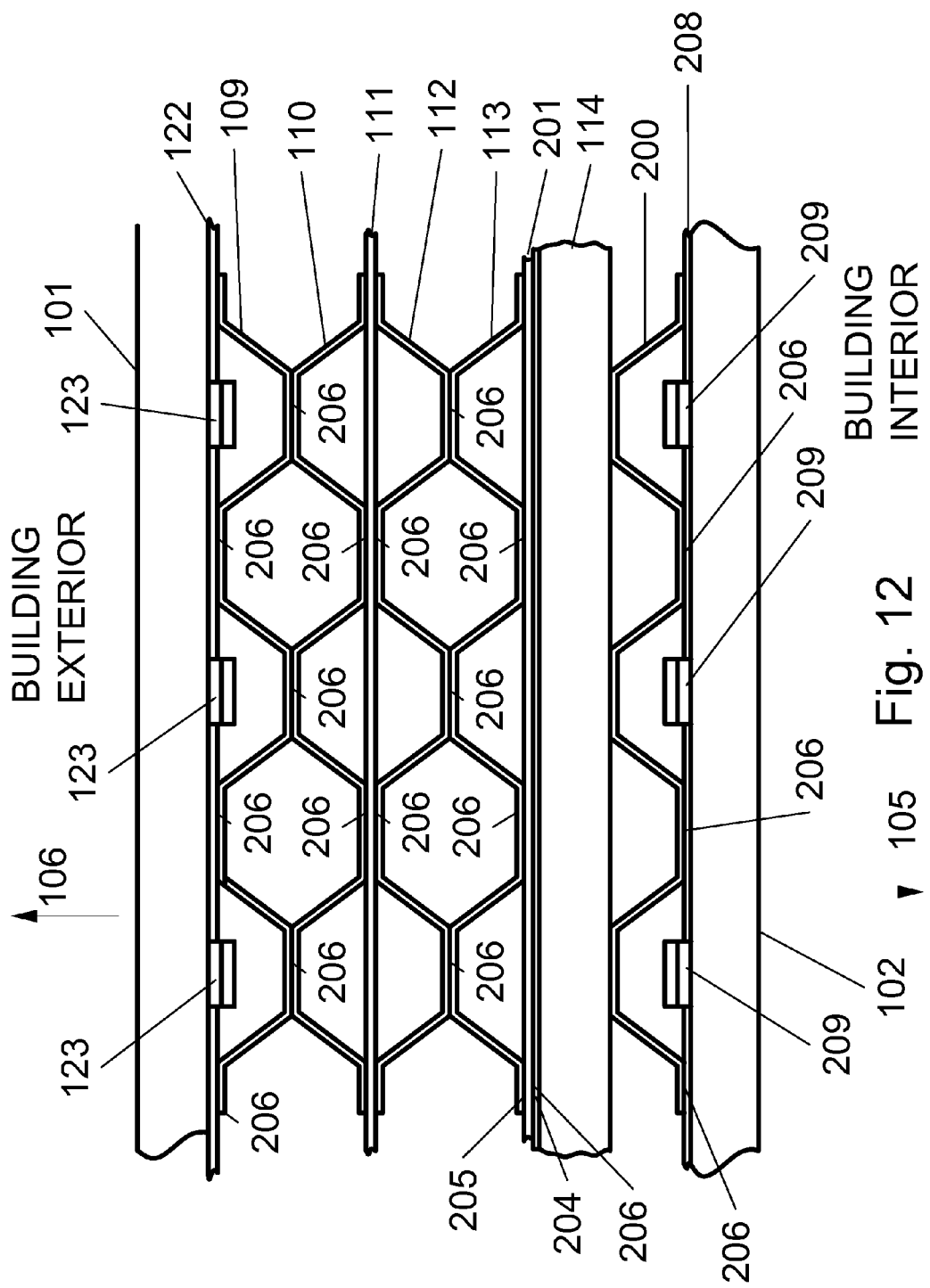
FIG. 12 depicts a cross sectional view of an alternate embodiment of the improved modular building panel of the invention in which the components are attached by chemical bonding.

Referring now to FIG. 12, a cross-section view of an alternate embodiment of the modular building panel of the invention is depicted in which chemical bonding 206 is the attachment means for attaching first vertical corrugated panel 109 to second vertical corrugated panel 110, and for attaching second vertical corrugated panel 110 to thermal break panel 111. Likewise, chemical bonding 206 is the attachment means for attaching third vertical corrugated panel 112 to fourth vertical corrugated panel 113. Chemical bonding may be the attachment means for attaching fourth vertical corrugated panel 113 to second thermal break panel 201 which may also be chemically bonded to horizontal corrugated panel 114. Horizontal corrugated panel 114 may also be chemically bonded to fifth vertical corrugated panel 200, and interior panel mounting clips 209 may be chemically bonded to interior panel interior surface 127 or may be attached to interior panel interior surface 127 by threaded fasteners and are engaged with interior panel mounting strip 208. Likewise, exterior panel mounting strip 122 may be engaged with exterior panel mounting clips 123, where exterior panel mounting clips 123 may be chemically bonded or attached with a threaded fastener to exterior panel interior surface 128. As with all embodiments of the invention, the vertical interstitial spaces may be filled with interstitial filler material 153 in any or all vertical interstitial spaces.

Figure 13:
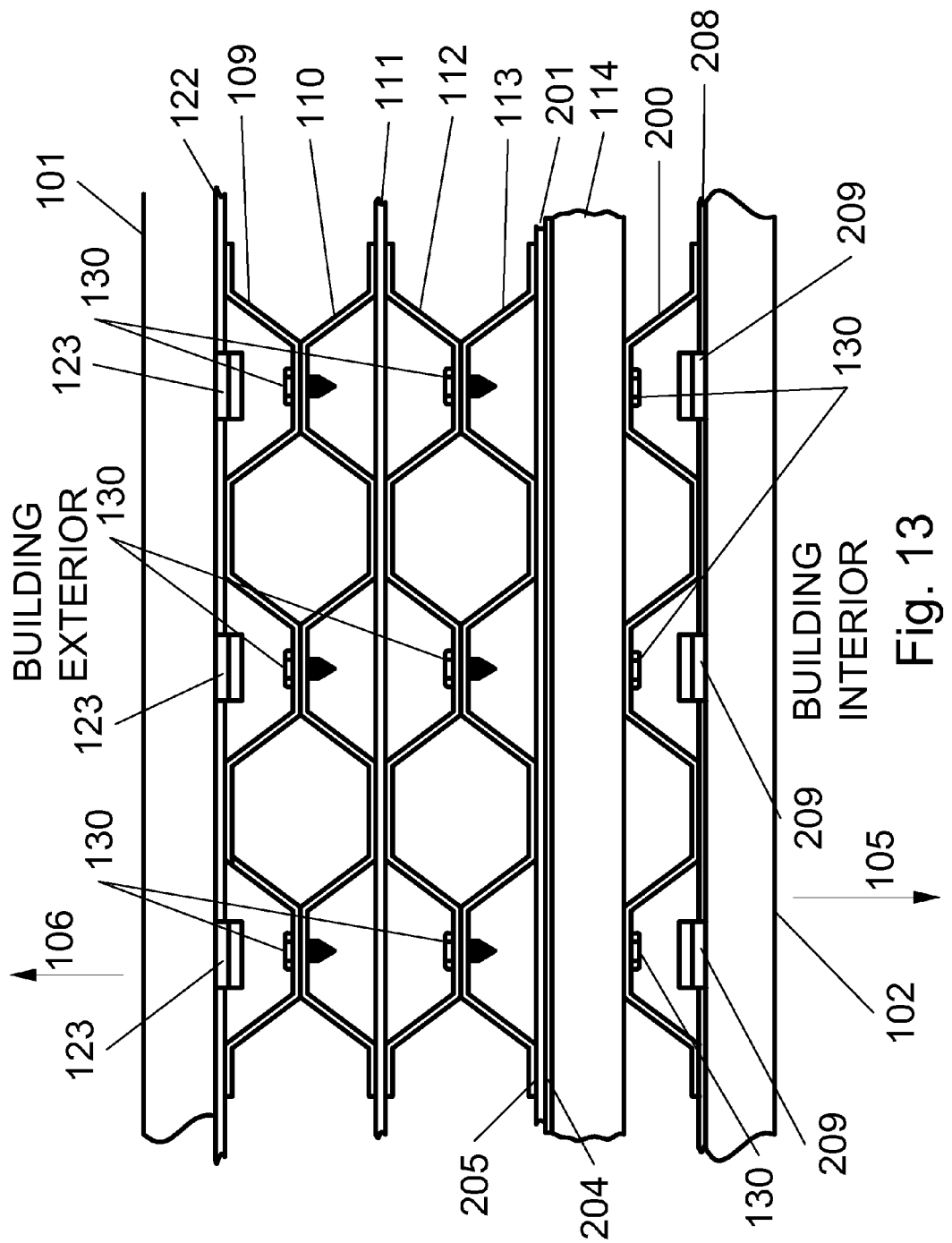
FIG. 13 a cross sectional view of an alternate embodiment of the improved modular building panel of the invention in which the components are attached by threaded fasteners.

Referring now to FIG. 13, a cross sectional view of an alternate embodiment of the improved modular building panel of the invention in which the components are attached by threaded fasteners is depicted. Threaded fasteners 130, which may be for example, hex-head sheet-metal screws, attach first vertical corrugated panel 109 to second vertical corrugated panel 110 as shown, and attach third vertical corrugated panel 112 to fourth vertical corrugated panel 113 as shown. Likewise, fifth vertical corrugated panel 200 is attached to horizontal corrugated panel 114 by threaded fasteners, which may include hex head sheet metal screws 130 as shown in the figure. Second thermal break panel first attachment surface 204 and second thermal break panel second attachment surface 205 may be attached to fourth vertical corrugated panel 113 and horizontal corrugated panel 114, respectively, by any means known in the art which may include chemical bonding, rivets, threaded fasteners or any other means known in the art for attaching planar surfaces.

Figure 14:
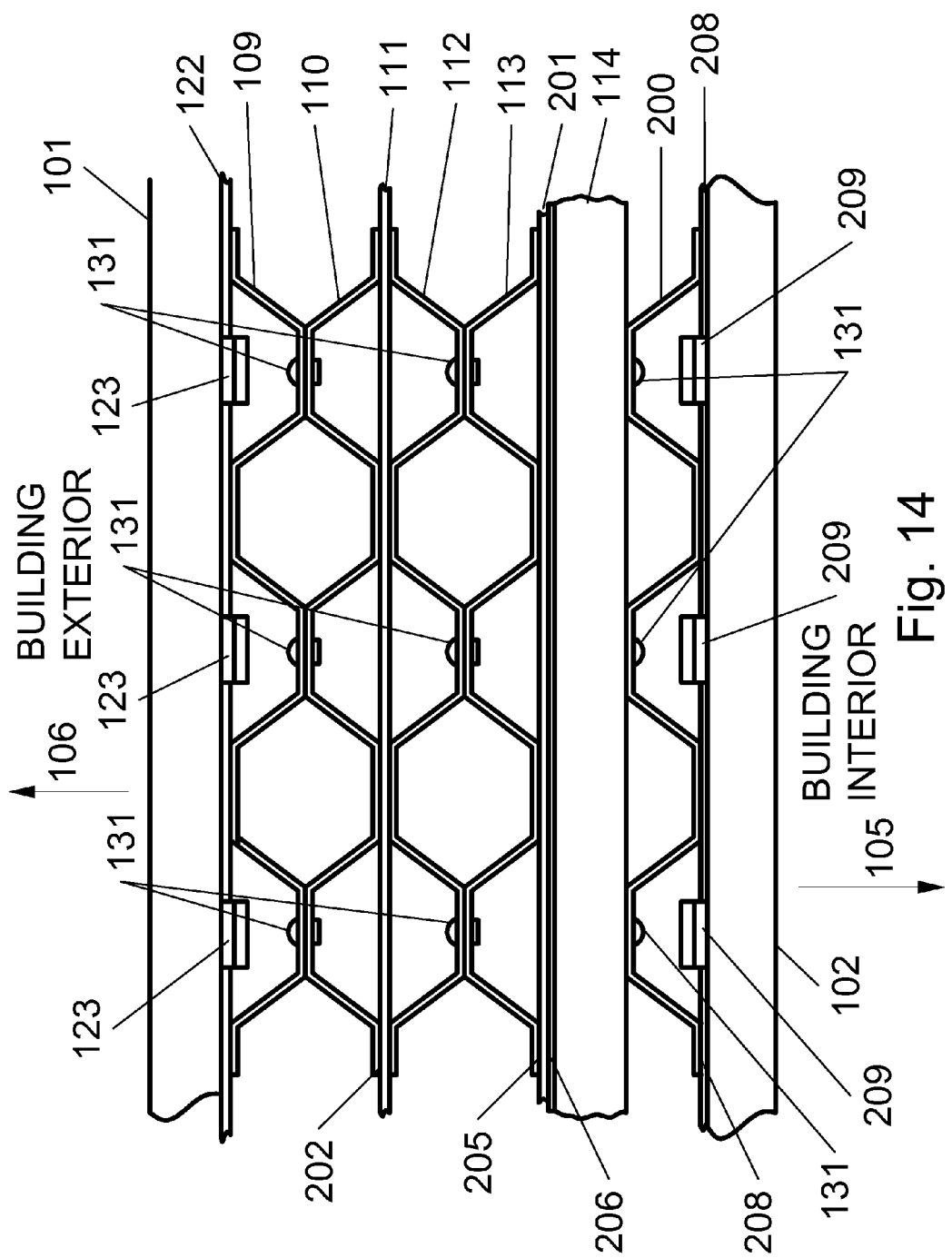
FIG. 14 depicts a cross sectional view of an alternate embodiment of the improved modular building panel of the invention in which the components are attached by rivets.

Referring now to FIG. 14, a cross sectional view of an alternate embodiment of the improved modular building panel of the invention in which the components are attached by rivets is depicted. Rivets 131 attach first vertical corrugated panel 109 to second vertical corrugated panel 110 as shown, and attach third vertical corrugated panel 112 to fourth vertical corrugated panel 113 as shown. Likewise, fifth vertical corrugated panel 200 is attached to horizontal corrugated panel 114 by rivets 131 as shown in the figure. Second thermal break panel first attachment surface 204 and second thermal break panel second attachment surface 205 may be attached to fourth vertical corrugated panel 113 and horizontal corrugated panel 114, respectively, by any means known in the art which may include chemical bonding, rivets, threaded fasteners or any other means known in the art for attaching planar surfaces.

Figure 15:
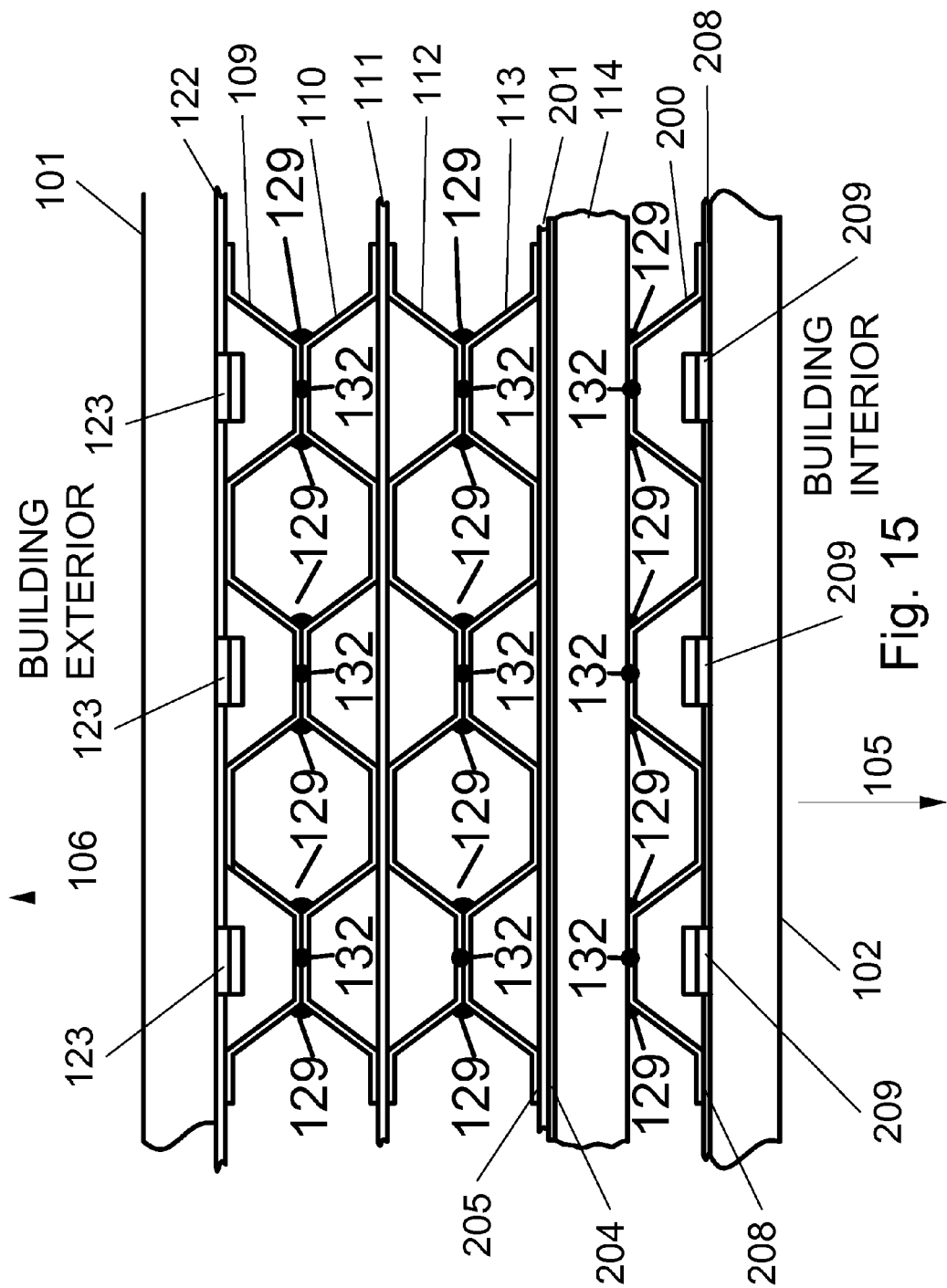
FIG. 15 depicts a cross sectional view of an alternate embodiment of the improved modular building panel of the invention in which the components are attached by welding.

Referring now to FIG. 15, a cross sectional view of an alternate embodiment of the improved modular building panel of the invention in which the components are attached by welding is depicted. Welds 129 and 132 may attach first vertical corrugated panel 109 to second vertical corrugated panel 110 as shown, and attach third vertical corrugated panel 112 to fourth vertical corrugated panel 113 as shown. Likewise, fifth vertical corrugated panel 200 may be attached to horizontal corrugated panel 114 by welds 132 and 129 as shown in the figure. Second thermal break panel first attachment surface 204 and second thermal break panel second attachment surface 205 may be attached to fourth vertical corrugated panel 113 and horizontal corrugated panel 114, respectively, by any means known in the art which may include chemical bonding, rivets, threaded fasteners or any other means known in the art for attaching planar surfaces.

Figure 16:
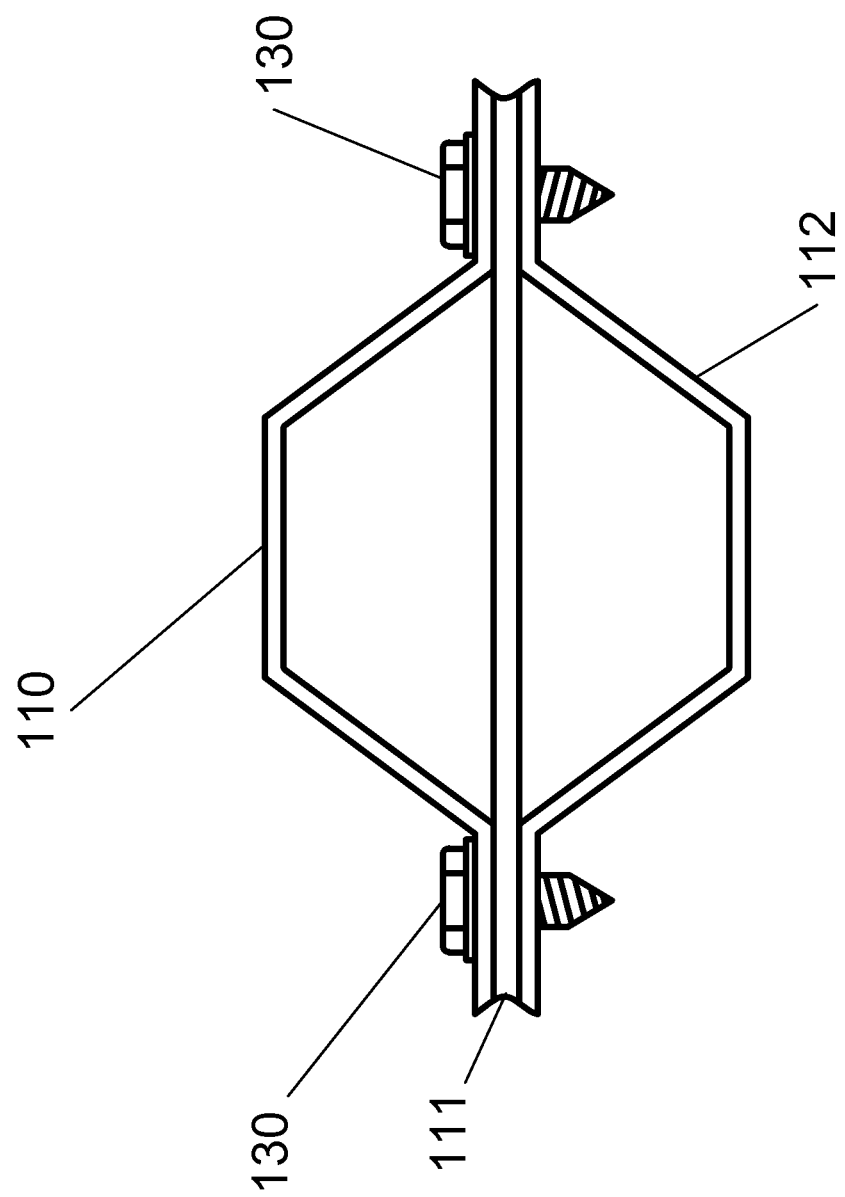
FIG. 16 depicts a cross sectional view of an alternate embodiment of the improved modular building panel of the invention in which vertical corrugated panels are attached to a thermal break panel by threaded fasteners.

Referring now to FIG. 16, a cross sectional view of an alternate embodiment of the improved modular building panel of the invention in which vertical corrugated panels may be attached to a thermal break panel by threaded fasteners. Second vertical corrugated panel 110 is attached to thermal break panel 111 and also attached to third vertical corrugated panel 112 by threaded fasteners 130 as shown in the figure. Threaded fasteners 130 may be, for example, hex head sheet-metal screws.

Figure 17:
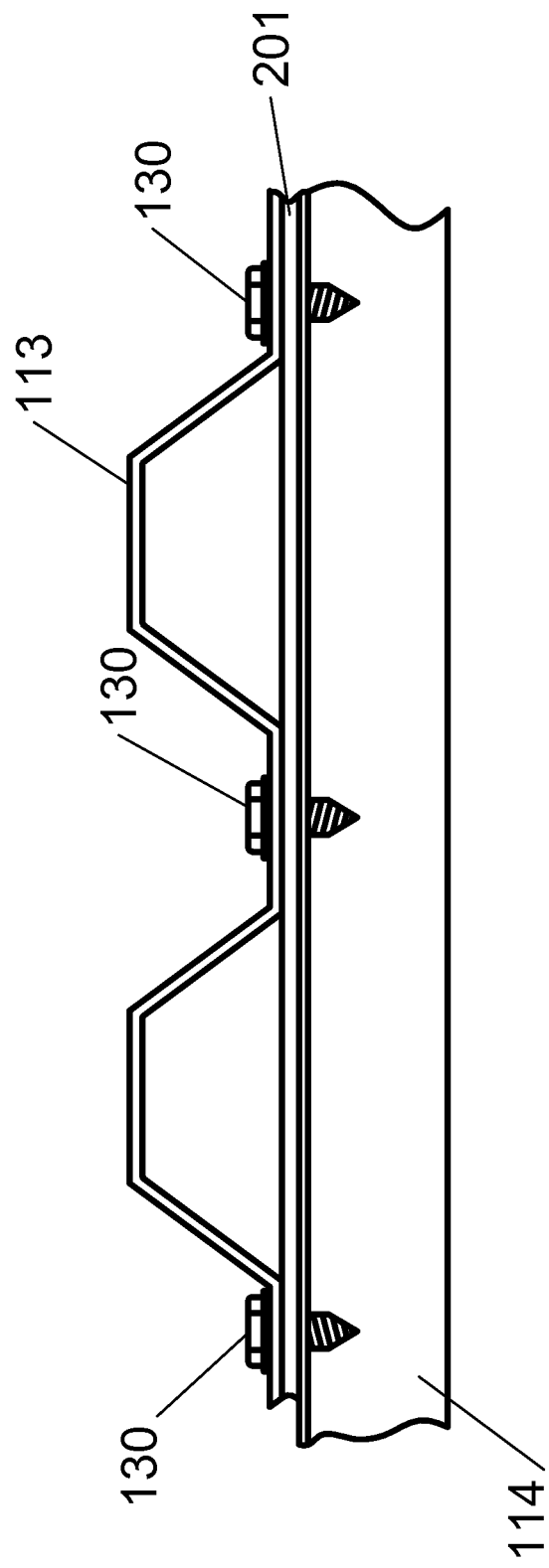
FIG. 17 depicts a cross sectional view of an alternate embodiment of the improved modular building panel of the invention in which corrugated panels and a thermal break panel are attached by threaded fasteners.

Referring now to FIG. 17, a cross sectional view of an alternate embodiment of the improved modular building panel of the invention in which corrugated panels and a thermal break panel are attached by threaded fasteners is depicted. Fourth vertical corrugated panel 113 may be attached to second thermal break panel 201 and horizontal corrugated panel 114 by threaded fasteners 130 as depicted in the figure. Threaded fasteners 130 may be for example hex head sheet-metal screws.

Figure 18:
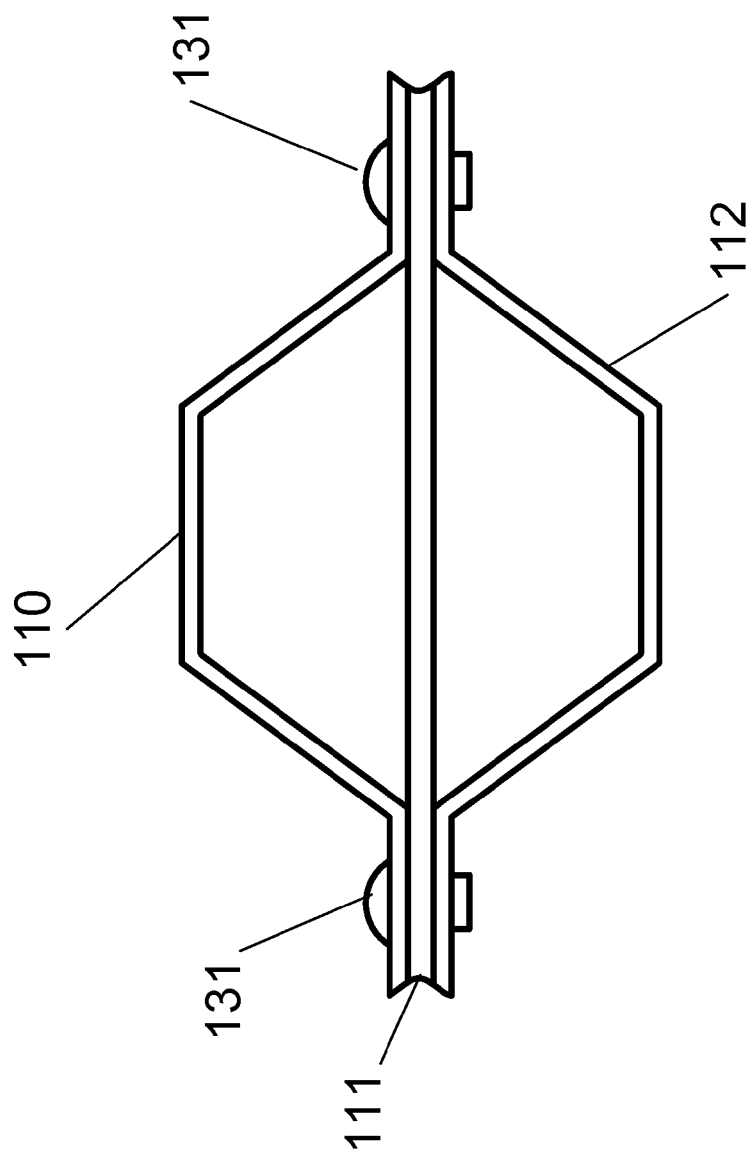
FIG. 18 depicts a cross sectional view of an alternate embodiment of the improved modular building panel of the invention in which vertical corrugated panels are attached to a thermal break panel using rivets.

Referring now to FIG. 18, a cross sectional view of an alternate embodiment of the improved modular building panel of the invention in which vertical corrugated panels are attached to a thermal break panel using rivets is depicted. Second vertical corrugated panel 110 may be attached to thermal break panel 111 and third vertical corrugated panel 112 by rivets 131 as shown in the drawing.

Figure 19:
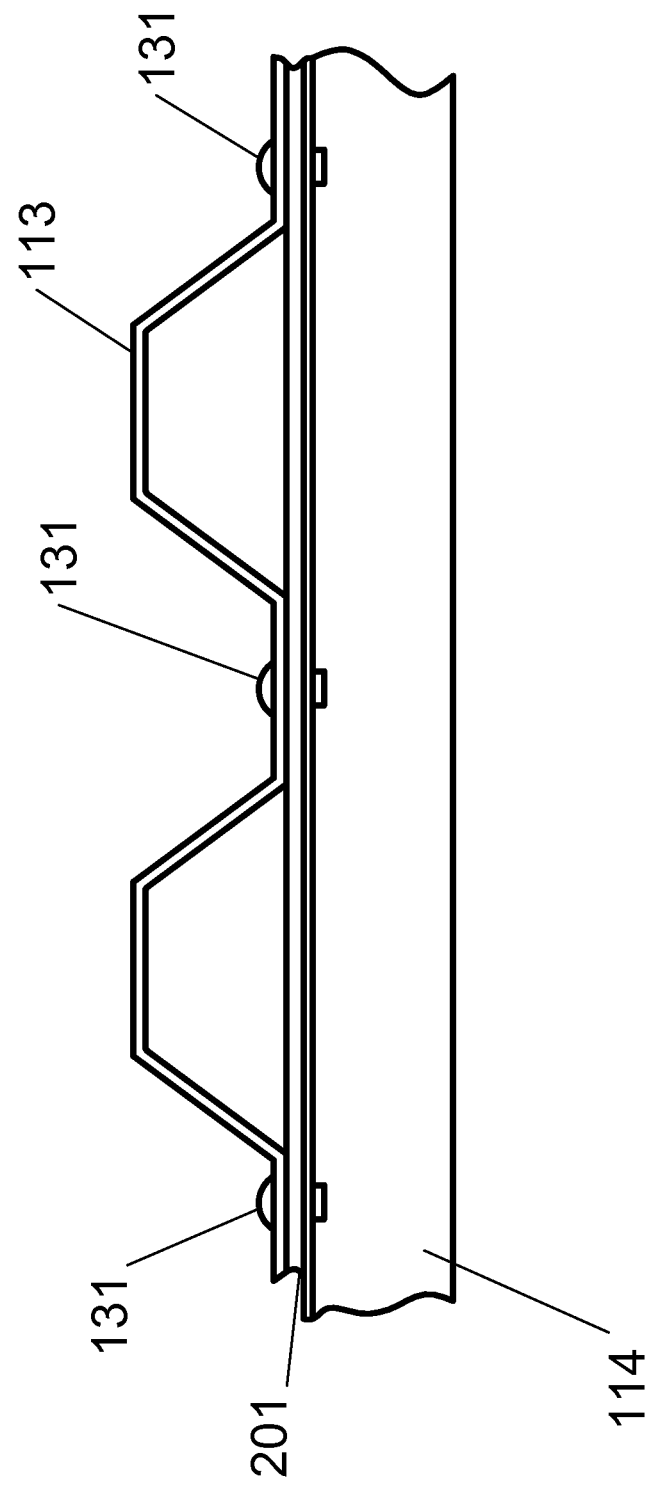
FIG. 19 depicts a cross sectional view of an alternate embodiment of the improved modular building panel of the invention in which vertical corrugated panels are attached to a thermal break panel using rivets.

Referring now to FIG. 19, a cross sectional view of an alternate embodiment of the improved modular building panel of the invention in which vertical corrugated panels are attached to a thermal break panel using rivets is depicted. Fourth vertical corrugated panel 113 may be attached to second thermal break panel 201 and horizontal corrugated panel 114 by rivets 131 as shown in the drawing.

It is to be understood that the embodiments of the invention described herein are exemplary in nature and that the number of honeycomb or corrugated panels comprising the modular building panel baby as many or as few as the user desires based upon structural load, desired heat transfer characteristics, desired acoustic insulation characteristics and other like considerations. The number of layers shown in figures of the drawings therefore should not be construed as a strict limitation on the scope or breadth of the invention.

Exterior panel 101 and interior panel 102 may comprise a novel cement mixture of the invention, described below.

The layered, composite structure of the system and method of the invention as depicted in the figures of the drawings and described herein creates a stiff, lightweight cross-section that is able to withstand wind and seismic loading, for instance with wind speeds up to or in excess of 160 mph. Furthermore the system and method of the invention as depicted in the figures of the drawings and described herein results in a structure that is able to withstand seismic loads of shock and vibration, including impulse loads that would cause significant damage to, or destroy, buildings constructed using traditional techniques such as steel reinforced concrete block or poured concrete construction.

All corrugated panels are, preferably, constructed of metal which is preferably, but not limited to, aluminum. A preferred embodiment of the system and method of the invention comprises corrugated panels that are constructed from $\frac{1}{16}$" thick 5000 series alloy aluminum sheet metal such as 5052, 5086. The corrugated panels may be sheets that have been formed into a corrugated cross-section forming by roll forming, press braking, or any other known means of manufacturer for transforming a flat into a corrugated panel. Corrugated panels of the invention may comprise one half of a honeycomb structure of hexagonal cross-sections, wherein the hexagonal shapes so constructed are affixed together by the use of sheet metal screws, aluminum rivets, spot welding, spot welding at six inch or other intervals, chemical bonding, or any other method known in the art for attaching sheet metal structures of like kind to one another. While $\frac{1}{16}$" thick 5000 series aluminum alloy is a preferred embodiment for the corrugated panels of the invention, the corrugated panels may be constructed from any thickness, and from any material whether metal or other material, which is suitable for forming as shown in the figures of the drawings. The honeycomb construction may be of any dimension suitable for the desired structural characteristics of the improved modular panel and is not to be considered a limitation of the system and method of the invention. The use of aluminum as a preferred embodiment enables a lightweight structure that is capable of withstanding significant wind load, seismic load, or projectile load resulting in a secure structure. The corrugated panels of the invention may be any thickness but may, in an alternate embodiment, be between 1 and 30 gauge, inclusive.

The orientation of the corrugated panels of the invention provides a stiffening moment of inertia to the total structure keeping the entire structure rigidly resisting forces which are trying to bend the modular wall panel about the ordinate axis. Additionally, this configuration provides significant benefits in that the horizontal corrugated panel 114 allows for the running of electrical, plumbing, communications, or heating ventilation and air-conditioning raceways that may traverse lengthwise through the structure for easy access and convenience. A significant advantage provided by the system and method of the invention over other panel designs which are based upon a honeycomb construction is that horizontal corrugated panel 114 provides raceways for the easy installation of plumbing, electrical, communications, and other systems in the building structure.

It is to be noted that the aluminum as described herein is a preferred embodiment for the corrugated panels of the invention, but other embodiments are included in the scope of the claims. The corrugated panels of the invention may, in alternate embodiments, comprise steel, other metals, fiberglass, carbon fiber, plastics especially high-strength plastics, other composite materials or any other materials that may be formed to or fabricated into the corrugated shape as required for the modular building panel of the invention.

The thermal break panels 111 and 201 comprise, in a preferred embodiment, quarter-inch thick fiberglass panels. These elements provide a thermal break in that they impede a free flow of heat by conduction through the metal elements of the honeycomb of the modular wall panel. The thermal break panels 111 and 201 may be of any thickness as desired by the user. The thermal break panels 111 and 201 may be assembled on to the adjacent honeycomb components by any means known in the art which may include chemical bonding, sheet-metal screw attachment, rivets or any other means known in the art to mechanically attach such structural elements together. The thermal break panels 111 and 201 may also be fabricated from high molecular mass recycled plastic. The thermal break panels of the modular building panel of the invention may be any thickness but are preferably one eighth inch to one quarter inch thick.

The term chemically bonded as used in this application refers to any adhesive based bonding technique known in the art of building construction, but is preferably a two part structural epoxy or other chemical bonding agent with similar strength characteristics.

The modular building panel of the invention comprises lightweight panels 101 and 102. These panels may be comprised of standard concrete mixes, but preferably are comprised of a novel concrete mixture that affords light weight and superior structural qualities when used in combination with the other elements of the improved modular wall panel of the system and method of the invention. Specifically, the novel concrete mixture exhibits a strength of high quality concrete which may be as high as 5000 PSI compression, 100 psi tension at approximately ⅓ the total overall mass of ordinary 2000 PSI construction concrete aggregate. Thus, the novel concrete mixture represents a superior strength to weight ratio and affords the ability to construct light weight modular honeycomb building panels that exhibit significant strength improvement over the prior art.

In a preferred embodiment, the concrete may be poured into a physical mold, or form, under controlled temperature and hydration environments. Within the mold may be a fiberglass lattice fabric which is comprised of approximately 0.5"×0.5" square holes. A layer of fiberglass lattice fabric is prepared in the mold as close to the surface of the mold as possible, and another is placed as close to the opposing surface is possible while still being poured by the novel concrete mix of the invention after the foreign process is complete. It is desired that the fiberglass elements not protrude through the surface of the finished poured concrete panel.

After the concrete panel is poured using the novel concrete mix of the invention, which is described elsewhere herein, the aluminum honeycomb elements of the system and method of the invention may be attached to the concrete panel. Exterior panel mounting clips a engage exterior panel mounting strip as hereinbefore described to secure exterior panel 101 to the vertical corrugated panels of the invention. Likewise, interior panel 102 may be assembled onto the modular building panel of the invention by virtue of interior panel mounting brackets becoming engaged with interior panel mounting clips so as to secure interior panel 102 to the modular building panel of the invention.

The novel concrete mix of the invention which may comprise inner panel 102 and outer panel 101 may comprise of Portland cement, silica sand, perlite, glass beads of 1 to 2 mm average diameter, glass beads of 2 to 4 mm average diameter, fiberglass shards averaging 18 mm, vinyl ester (or epoxy), and water in the following ratio as shown in Table 1. While specific quantities are shown in Table 1, it is understood that any quantities may be used in the novel concrete mix of the invention in order to produce a desired quantity, as long as the ratio of components is substantially equivalent to that depicted in the Table.

TABLE 1

Concrete Mix Ratios

| Item | Amount |
| --- | --- |
| Portland cement | 1 cu. ft. |
| Silica sand | 1 cu. ft. |
| Perlite | 2 ½ cu. ft. |
| glass beads of 1 to 2 mm average diameter | 5 gallons |
| glass beads of 2 to 4 mm average diameter | 5 gallons |
| fiberglass shards averaging 18 mm | 5 gallons |
| vinyl ester or epoxy | ½ gallon |
| water | 7 gallons |

The amounts shown in Table 1 are to be taken to include reasonable variances for the tolerance of the usual techniques of measuring and mixing concrete and cement mixes, thus the amounts shown are to be taken as including reasonable variations thereof to account for inaccuracies and measuring and in mixing concrete components.

The components of the novel concrete mix of the invention provide various features and benefits. The Portland cement is the main ingredient forming the concrete mix and is responsible for forming the basic structural latticework of the finished concrete by binding the concrete elements together. The silica sand forms the skeleton of the structural latticework of the concrete. The irregular surface of the crushed quartz which forms the silica sand gives the Portland cement a structure on which to adhere. The perlite is a naturally occurring igneous rock used in construction and also for various purposes in horticulture. It has less mass than Portland cement and sand, and has more favorable thermal insulation qualities than the cement alone. The addition of perlite improves the thermal insulation qualities of the novel concrete mix of the invention without adversely affecting cost or structural performance. The glass beads of 1 to 2 mm average diameter perform essentially the same role as the silica sand with the exception that the slightly higher tensile strength of glass contributes to more flexible stress distribution in the final mix. This more flexible stress distribution is an important aspect of the novel concrete mix of the invention. The glass beads of 2 to 4 mm average diameter also provide a more flexible stress distribution which differs from the glass beads of 1 to 2 mm average diameter, and the combination provides the desired structural characteristics. The fiberglass shards add tensile strength to concrete mix. Without the fiberglass shards the concrete mix would suffer from inferior tensile strength. The length of the fiberglass shards is important because shards of two short a length lose effectiveness in that they do not provide the desired wetting surface; shards of too long a length present difficulties in the manufacturing process because they become difficult to insert into the mix due to handling difficulties. The ideal length of the fiberglass shards is 18 millimeters, although varying length may be used. The vinyl ester and/or epoxy, which is activated using a separate catalyst which is usually metal perchlorate, is generally premixed and added to the concrete mix at the last stage. The use of vinyl ester and/or epoxy in the concrete mix is unique to the novel cement mix of the system and method of the invention. The vinyl ester (and/or epoxy) and fiberglass shards operate together to create a cured or semi-cured structure within the concrete before the concrete hardens, that is, while it is still hydrating. This allows the concrete panel of the invention to be handled at a very early stage, prior to the final curing of the concrete. This allows a dramatically reduced fabrication time, resulting in significant cost and time savings in assembling the improved modular building panel of the system and method of the invention. Pressurized nitrogen gas may also be added in order to facilitate and improve the time characteristics. The water ingredient is the typical water ingredient that is using concrete curing and provides hydrating of the Portland cement mixture.

Further alternate embodiments of the novel concrete mix of the system and method of the invention include adding the ingredients of fly ash, water slacked lime (calcium carbonate), sugar, Polyethylene Teripthalate shards, and Elemix™ XE polystyrene spheres together or in any combination. Fly ash may be added to concrete mixes to assist high trading in to lighten the concrete mix. Calcium carbonate may be added to change the ultimate compression strength of the high-grade concrete. Sugar may be added to retard high trading in certain circumstances, such as extremely low relative humidity environments.

The novel modular building panel and concrete mix allows for rapid construction. It is estimated that a single family home may be constructed and occupied using the modular wall panel and concrete mix of the system and method of the invention in less than 21 days. A preferred embodiment of the modular wall panel has about the same footprint, thickness, as a traditional concrete block in drywall structural configuration. Alternate embodiments of the modular wall panel of the method and system of the invention may be of thinner cross-section or thicker cross-section depending upon the desire of the designer.

One or all of the vertical interstitial spaces of the corrugated panels and any other interstitial spaces formed by the structure of the various embodiments of the invention, especially vertical interstitial spaces, may be filled with a filler material such as, for example, Aerogel, Sand, Perlite, no filler, any thermally or acoustically insulating material known in the art, or any combination thereof. Aerogels are an open-celled, mesoporous, solid foam that is composed of a network of interconnected nanostructures and that exhibits a porosity (non-solid volume) of no less than 50%. Aerogels may be fabricated from, for example, silica; transition metal oxides such as iron oxide; lanthanide and actinide metal oxides such as praseodymium oxide; main group oxides such as tin oxide; organic polymers such as resorcinol-formaldehyde, phenol-formaldehyde, polyacrylates, polystyrenes, polyurethanes, and epoxies; biological polymers such as gelatin, pectin, and agar; semiconductor nanostructures such as cadmium selenide; carbon; carbon nanotubes; and metals.

The improved modular building panel of the system and method of the invention comprises a novel concrete mix that is lightweight and exhibits superior strength characteristics that are not subject to degradation when submersed in water. Therefore the improved modular building panel of the invention will retain its structural integrity after a significant weather or other event which causes flooding of a finished structure or flooding of modular panels which have not yet been assembled into a completed structure. These building panels may be stored in low-lying coastal areas and used to quickly erect structures after a significant event such as a hurricane or tsunami; and structures that were fabricated and constructed from the improved modular wall panel of the system and method of the invention prior to the significant weather event will be habitable immediately after floodwaters recede. This quality of the improved modular building panel of the invention provides significant savings and safety to persons living and working in such areas after a significant weather event.

What is claimed is:

1. An improved modular wall system, comprising:
an inner panel having an interior side, exterior side, top edge, bottom edge, and right side edge;
an outer panel having an interior side, exterior side, top edge, bottom edge, and right side edge;
a first corrugated panel having a top and a bottom;
a second corrugated panel having a top and a bottom;
a third corrugated panel having a top and a bottom;
a fourth corrugated panel having a top and a bottom;
wherein said first corrugated panel and said second corrugated panel are attached by a first attachment means selected from the group consisting of chemical bonding, threaded fasteners, rivets and welding to form a first honeycomb structure having a first side and a second side, and wherein said third corrugated panel and said fourth corrugated panel are attached by a second attachment means selected from the group consisting of chemical bonding, threaded fasteners, rivets and welding to form a second honeycomb structure having a first side and a second side, said first honeycomb structure and said second honeycomb structure comprising a plurality of interstitial spaces;
a horizontal corrugated panel having a posterior side and an anterior side;
a thermal break panel having a first side and a second side;
a first top plate having a thickness and a second top plate having an upper surface;
a male snap channel having a chevron channel and a female snap channel having a chevron channel adapted to provide a spring loaded retaining fit with said male snap channel chevron channel,
a first support channel and a second support channel;
a bottom channel;
an exterior panel mounting strip and a plurality of exterior panel mounting clips attached to said interior side of said exterior panel; and
a plurality of interior panel mounting brackets attached to said posterior side of said horizontal corrugated panel, said interior panel mounting brackets adapted to receive a plurality of exterior panel mounting clips attached to said interior side of said interior panel,
wherein said first honeycomb structure first side is attached to said thermal break panel first side, and wherein said second honeycomb structure is attached to said thermal break panel second side by said first attachment means; and
wherein said second honeycomb structure second side is attached to said horizontal corrugated panel anterior side by said first attachment means; and
wherein said first top plate is attached to said inner surface of said interior panel at said top of said interior panel by said first attachment means such that said upper surface of said first top plate is substantially flush with said top of said interior panel; and
wherein said second top plate is attached to said inner surface of said exterior panel at said top of said exterior panel by said first attachment means such that said upper surface of said second top plate is spaced below said top of said interior panel said thickness of said first top plate, and wherein said first top plate and said second top plate are attached by a plurality of sheet metal screws; and wherein said bottom plate is disposed between and attached to said inner surface of said exterior panel and said inner surface of said interior panel by said first attachment means, such that the bottom surface of said bottom plate forms a substantially flush closure to said modular building panel; and wherein said male snap channel is disposed between and attached to said interior panel interior surface and said exterior panel interior surface by said first attachments means; and wherein said female snap channel is disposed between and attached to said interior panel interior surface and said exterior panel interior surface by said first attachments means; and wherein said exterior panel mounting strip is attached to said second side of said first honeycomb structure running in a transverse direction the corrugations of said first and second corrugated panel, and adapted to receive said exterior panel mounting clips in a sliding engagement such that when said exterior panel mounting clips are engaged with said exterior panel mounting strip, said exterior panel is held in place and forms the exterior surface of the modular building panel; and wherein said plurality of interior panel mounting brackets are adapted to receive said plurality of interior panel mounting clips in a sliding engagement such that when said interior panel mounting clips are engaged with said interior panel mounting brackets, said interior panel is held in place and forms the interior surface of the modular building panel.

2. An improved modular wall system as in claim 1, wherein said inner panel and said outer panel are constructed of concrete comprising the ratio of one cubic foot of Portland cement, one cubic foot of silica sand; two and a half cubic feet of perlite; 5 gallons of glass beads between 1 mm and 2 mm diameter; five gallons of glass beads between 2 mm and 4 mm diameter; one half gallon of vinyl ester; and seven gallons of water.

3. An improved modular building panel as in claim 2 wherein said thermal break panel is between one eighth and one quarter inch thick.

4. An improved modular building panel as in claim 1 wherein said thermal break panel is fabricated from the group consisting of high molecular mass recycled plastic and quarter-inch thick fiberglass.

5. An improved modular building panel as in claim 2 wherein said thermal break panel is fabricated from the group consisting of high molecular mass recycled plastic and quarter-inch thick fiberglass.

6. An improved modular building panel as in claim 3 wherein said thermal break panel is fabricated from the group consisting of high molecular mass recycled plastic and quarter-inch thick fiberglass.

7. An improved modular building panel as in claim 1 wherein said first corrugated panel, said second corrugated panel, said third corrugated panel, said fourth corrugated panel, and said horizontal corrugated panel are fabricated from aluminum of between and including 18 to 30 gauge.

8. An improved modular building panel as in claim 2 wherein said first corrugated panel, said second corrugated panel, said third corrugated panel, said fourth corrugated panel, and said horizontal corrugated panel are fabricated from aluminum of between and including 18 to 30 gauge.

9. An improved modular building panel as in claim 1 wherein said first corrugated panel, said second corrugated panel, said third corrugated panel, said fourth corrugated panel, and said horizontal corrugated panel are fabricated from fiberglass.

10. An improved modular building panel as in claim 1 wherein said first corrugated panel, said second corrugated panel, said third corrugated panel, said fourth corrugated panel, and said horizontal corrugated panel are fabricated from carbon fiber.

11. An improved modular building panel as in claim 1 wherein said interior panel and said exterior panel are constructed from a concrete mix comprising:
one cubic foot Portland cement;
one cubic foot silica sand;
two and a half cubic feet perlite;
five gallons glass beads of 1 mm to 2 mm diameter;
five gallons glass beads of 2 mm to 4 mm diameter;
five gallons Fiberglass shards averaging 18 mm in length;
one half gallon vinyl ester resin; and
seven gallons water.

12. An improved modular building panel as in claim 2 wherein said interior panel and said exterior panel are constructed from a concrete mix comprising:
one cubic foot Portland cement;
one cubic foot silica sand;
two and a half cubic feet perlite;
five gallons glass beads of 1 mm to 2 mm diameter;
five gallons glass beads of 2 mm to 4 mm diameter;
five gallons Fiberglass shards averaging 18 mm in length;
one half gallon vinyl ester resin; and
seven gallons water.

13. An improved modular building panel as in claim 3 wherein said interior panel and said exterior panel are constructed from a concrete mix comprising:
one cubic foot Portland cement;
one cubic foot silica sand;
two and a half cubic feet perlite;
five gallons glass beads of 1 mm to 2 mm diameter;
five gallons glass beads of 2 mm to 4 mm diameter;
five gallons Fiberglass shards averaging 18 mm in length;
one half gallon vinyl ester resin; and
seven gallons water.

14. An improved modular building panel as in claim 4 wherein said interior panel and said exterior panel are constructed from a concrete mix comprising:
one cubic foot Portland cement;
one cubic foot silica sand;
two and a half cubic feet perlite;
five gallons glass beads of 1 mm to 2 mm diameter;
five gallons glass beads of 2 mm to 4 mm diameter;
five gallons Fiberglass shards averaging 18 mm in length;
one half gallon vinyl ester resin; and
seven gallons water.

15. An improved modular building panel as in claim 5 wherein said interior panel and said exterior panel are constructed from a concrete mix comprising:
one cubic foot Portland cement;
one cubic foot silica sand;
two and a half cubic feet perlite;
five gallons glass beads of 1 mm to 2 mm diameter;
five gallons glass beads of 2 mm to 4 mm diameter;
five gallons Fiberglass shards averaging 18 mm in length;
one half gallon vinyl ester resin; and
seven gallons water.

16. An improved modular building panel as in claim 6 wherein said interior panel and said exterior panel are constructed from a concrete mix comprising:
- one cubic foot Portland cement;
- one cubic foot silica sand;
- two and a half cubic feet perlite;
- five gallons glass beads of 1 mm to 2 mm diameter;
- five gallons glass beads of 2 mm to 4 mm diameter;
- five gallons Fiberglass shards averaging 18 mm in length;
- one half gallon vinyl ester resin; and
- seven gallons water.

17. An improved modular building panel as in claim 1, wherein at least one of said plurality of interstitial spaces are filled with an interstitial filling material.

18. An improved modular building panel as in claim 16, wherein at least one of said plurality of interstitial spaces are filled with an interstitial filling material.

* * * * *